: 
United States Patent [19]

Clearfield

[11] Patent Number: 5,200,378
[45] Date of Patent: * Apr. 6, 1993

[54] PILLARING OF LAYERED COMPOUNDS

[75] Inventor: Abraham Clearfield, College Station, Tex.

[73] Assignee: The Texas A&M University System, College Station, Tex.

[*] Notice: The portion of the term of this patent subsequent to May 21, 2008 has been disclaimed.

[21] Appl. No.: 702,804

[22] Filed: May 20, 1991

Related U.S. Application Data

[63] Continuation of Ser. No. 382,059, Jul. 14, 1989, Pat. No. 5,017,537, which is a continuation of Ser. No. 142,731, Jan. 11, 1988, abandoned.

[51] Int. Cl.$^5$ .............................................. B01J 29/04
[52] U.S. Cl. ........................................ 502/62; 502/63; 502/80; 502/84
[58] Field of Search .................. 502/62, 63, 80, 84

[56] References Cited

U.S. PATENT DOCUMENTS

| | | | |
|---|---|---|---|
| 4,176,090 | 11/1979 | Vaughan et al. | 252/455 Z |
| 4,248,739 | 2/1981 | Vaughan et al. | 502/63 |
| 4,510,257 | 4/1985 | Lewis et al. | 502/84 |
| 4,593,013 | 6/1986 | Jacobson et al. | 502/525 |
| 4,637,991 | 1/1987 | Battiste et al. | 502/84 |
| 4,717,513 | 1/1988 | Lewis et al. | 502/84 |
| 4,719,191 | 1/1988 | Battiste et al. | 502/63 |
| 4,757,040 | 7/1988 | Guan et al. | 502/63 |
| 5,017,537 | 5/1991 | Clearfield | 502/63 |

FOREIGN PATENT DOCUMENTS

WO88/00091 1/1988 World Int. Prop. O. .
WO88/00092 1/1988 World Int. Prop. O. .

OTHER PUBLICATIONS

Alberti, et al., "Pillared Compounds of the Zirconium Phosphate, Phosphate-Phosphonate and Diphosphonate Type," 119–126, in Workshop Report Pillard Layered Structures: Current Trends and Applications, Edited by I. V. Mitchell, Commission of The European Communities, Brussels, Belguim (Dec., 1989).

MacLachlan and Bibby, "Formation of Chromium Interlayers in α-Zirconium Phosphate," pp. 895–899, J. Chem. Soc. Dalton Trans. (1989).

Maireles-Torres, et al., "New Metal-Ozide Pillared Layered Tin Phosphate Material," 137–146, in Workshop Report Pillard Layered Structures: Current Trends and Applications, Edited by I. V. Mitchell, Commission of The European Communities, Brussels (Dec., 1989).

"Pillard Clays-A Historical Perspective", Catalysis Today, 2:187–198 (1988).

*Primary Examiner*—Patrick P. Garvin
*Assistant Examiner*—E. D. Irzinski

[57] ABSTRACT

A process is disclosed for pillaring layered materials which do not swell appreciably in water. The process comprises first intercalating an amine or other neutral molecule such as an amide or dimethyl sulfoxide between the layers of the material to be pillared. This allows the subsequent incorporation of inorganic pillars which are more temperature stable than the intercalated amine. Also, disclosed are different pillared products produced by the process. The starting materials do not appreciably swell in water and the pillared composition final product is produced by swelling with an inorganic intercalate and then displacing the inorganic intercalate with an inorganic pillaring substance. The pillared composition disclosed in this invention comprises layers of a group IV A or IV B phosphate, alkali titanate, titanium niobate, alkaline niobate, antimonate, manganate, silicate, or metal oxide separated by a pillaring substance, wherein said pillaring substance is selected from the group consisting of aluminum polymer, zirconium polymer, chromium polymer and bismuth polymer.

30 Claims, 6 Drawing Sheets

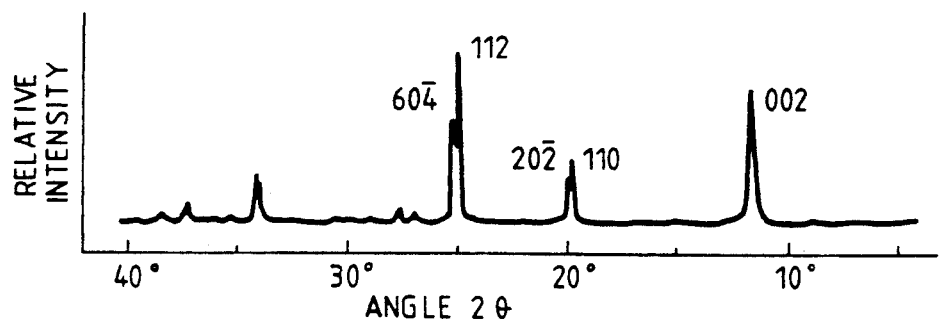
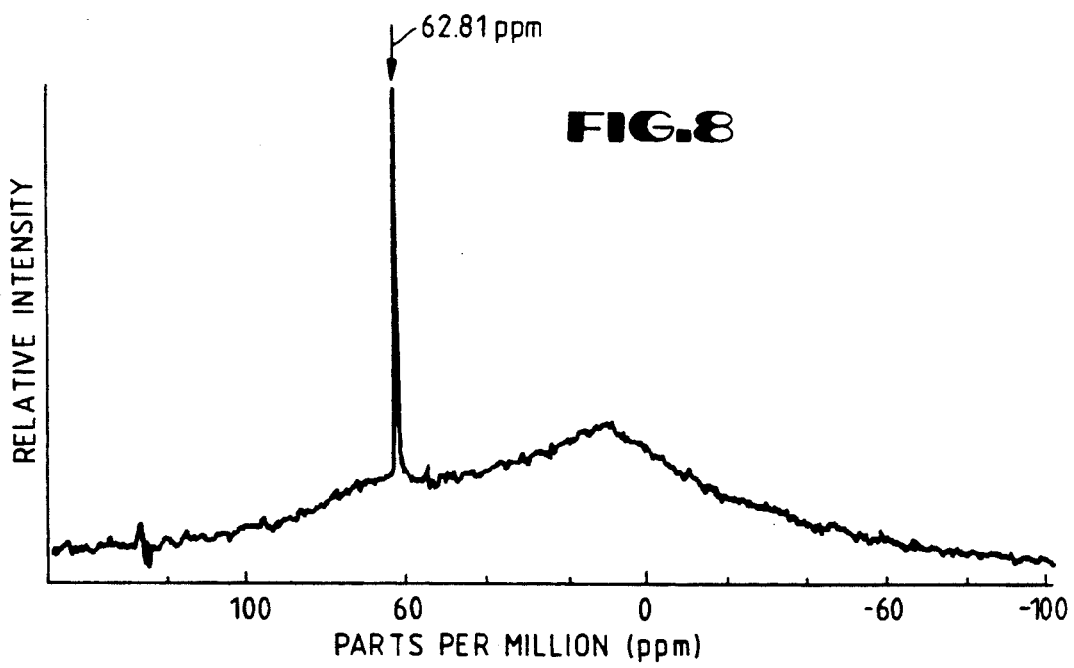

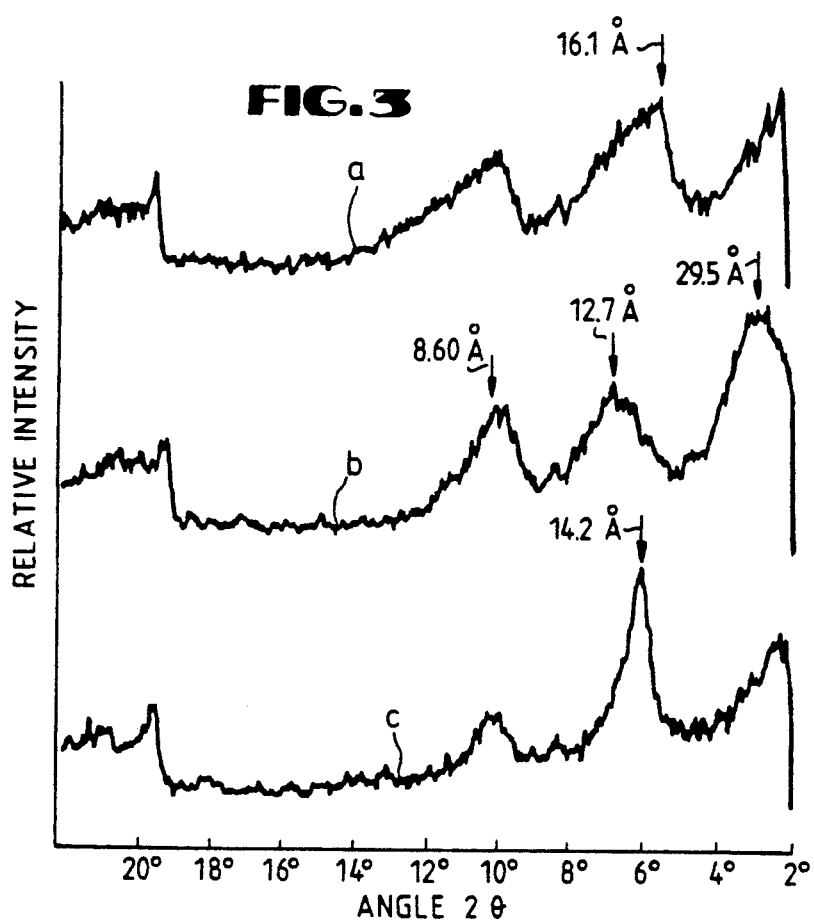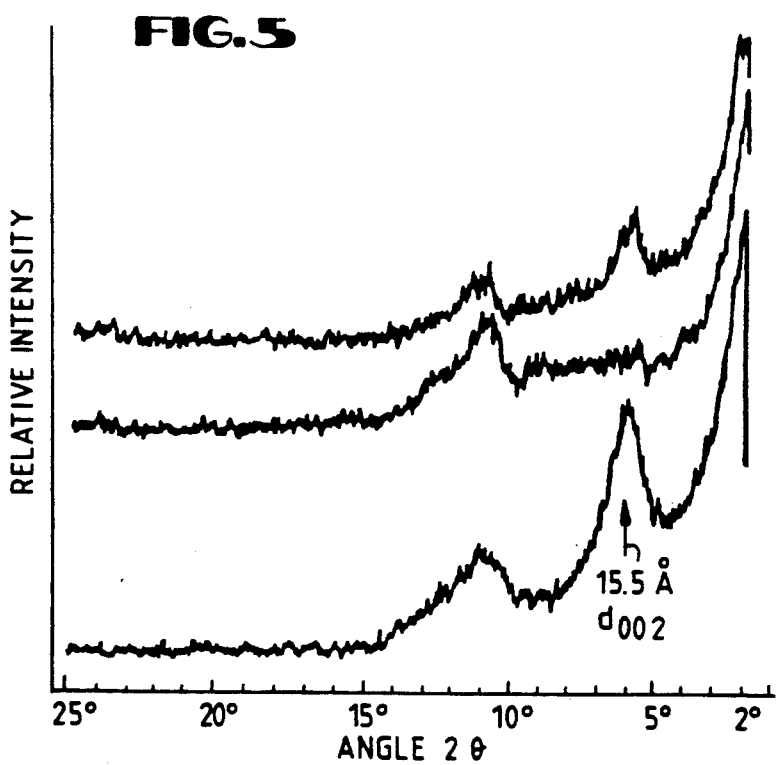

PILLARING OF LAYERED COMPOUNDS

BACKGROUND OF THE INVENTION

This application is a continuing application of U.S. patent application Ser. No. 07/382,059, filed Jul. 14, 1989 now U.S. Pat. No. 5,017,537 which is a continuation of application Ser. No. 07/142,731 filed Jan. 11, 1988, now abandoned.

1. FIELD OF THE INVENTION

This invention relates to layered materials, especially those which have useful catalytic and adsorbent properties. More particularly, it relates to a process for increasing the interlayer distance of such materials by incorporating pillars comprising inorganic substances. This process introduces pores or empty spaces between the layers thereby enhancing the sorptive capacity and catalytic properties of the material. This invention also relates to a pillared composition, which is the product produced by the process.

2. DESCRIPTION OF THE RELATED ART

In the preceding two decades, a new class of two-dimensional porous materials has been synthesized from smectite clay minerals. Smectite clays are able to swell in water because of their low layer charge, and thus easily intercalate organic guest molecules or large inorganic polymers. In general, the organically pillared structures suffer from the thermal instability of the organic component. The temperature sensitivity of these materials limits their utility as catalysts. Since a major incentive for preparing these materials is to produce new, catalytically active, large pore structures, robust, temperature stable pillars are required. Consequently, attention has focused on the use of the aluminum Keggin ion $[Al_{13}O_4(OH)_{24}\cdot 12H_2O]^{7+}$ and the zirconium tetramer $[Zr(OH)_2\cdot 4H_2O]_4^{8+}$ as pillars. A large literature has developed, details of which are given in recent reviews (see, e.g., T. J. Pinnavaia, Science, 220, 365 (1983) and A. Clearfield in "Surface Organo-metallic Chemistry," Proc. of NATO Workshop, May 25-30, 1986, Le Rouret, Fr. 1).

Clays as they occur in nature are rocks that may be consolidated or unconsolidated. Clays are composed of extremely fine crystals or particles of clay minerals with or without other rock or mineral particles. These crystals or particles are often colloidal in size and usually platy in shape. The clay minerals, mostly phyllosilicates, are hydrous silicates of aluminum, magnesium, iron, and other less abundant elements.

The very fine particles yield very large specific-surface areas that are physically sorptive and chemically surface-reactive. Many clay mineral crystals carry an excess negative electric charge owning to internal substitution by lower valent cations, and thereby increase internal reactivity in chemical combination and ion exchange. Catalysts made from various clay minerals are extensively used, e.g., in the cracking of heavy petroleum fractions. These catalysts are produced from halloysites, kaolinites, and bentonites composed of montmorillonite.

Smectites (montmorillonites) are the 2:1 clay minerals that carry a lattice charge and characteristically expand when solvated with water and alcohols, notably ethylene glycol and glycerol. In earlier literature, the term montmorillonite was used for both the group (now smectite) and the particular member of the group in which magnesium is a significant substituent for aluminum in the octahedral layer.

The cation-exchange capacity of smectite minerals is notably high, 80-90 meq or higher per 100 grams of air-dried clay. The crystal lattice is obviously weakly bonded. Moreover, the lattice of smectites is expandable between the silicate layers so that when the clay is soaked in water it may swell to several times its dry volume (e.g., bentonite clays).

The principal clay minerals are kaolinite, montmorillonite, and illite. These are actually three families of minerals since kaolinite has several modifications and since isomorphous substitution occurs in the latter two giving rise to other compositions having different mineral names. Closely associated with the above minerals are gibbsite, $Al(OH)_3$, diaspore, $HAlO_2$, and bauxite (of indefinite composition but usually given as $Al_2O_3\cdot 2H_2O$ which is an intermediate between the first two). All clays have as the major constituents one or more of the above minerals or minerals of the above families.

Montmorillonites have the general formula: $X_yAl_2\cdot(Al_ySi_{4-y}O_{10})(OH)_2$ where X is usually Na, Mg or Al. The montmorillonite group includes the minerals montmorillonite, nontronite, beidellite, hectorite, and saponite. The latter two are trioctahedral and the other three are dioctahedral. Extensive substitutions occur in the octahedral sites as well as substitutions of aluminum for silicon in the tetrahedral sites. Montmorillonite absorbs water readily with accompanying swelling. It is the principal mineral in bentonite and accounts for its high plasticity and usually very sticky nature. The structure of this group of minerals is like that of talc and is classified with the sheet or layer silicates.

Stable pillared interlayered clay compositions have been prepared by reacting smectic type clays with polymeric cationic hydroxy metal complexes of metals such as aluminum, zirconium and/or titanium. Vaughan et al., U.S. Pat. No. 4,176,090, describes a process in which naturally occurring or synthetic smectite type clays are reacted with aluminum chlorohydroxide complexes ("chlorhydrol"), and then heated to convert the hydrolyzed polymer complex into an inorganic oxide.

The general procedure described in Vaughan et al. comprises mixing a smectite clay with an aqueous solution of the polymeric cationic hydroxy metal complex. The mixture of clay and metal complex is maintained at a temperature up to 200° C. for up to 4 hours. The reacted clay solids are then recovered and heated at a temperature of 200°-700° C. to decompose the hydrolyzed metal complex to a pillar of inorganic oxide. The introduction of discrete/non-continuous inorganic oxide particles between the clay layers is said to produce pillared interlayered clays possessing a unique internal micropore structure.

Another patent to Vaughan et al., U.S. Pat. No. 4,248,739, describes a similar preparation of pillared interlayered clays which uses a polymeric cationic hydroxy inorganic metal complex having a molecular weight in excess of 2000. The complex may be formed by a hydrolysis-polymerization reaction of chlorhydrol. This reaction may be base-catalyzed. A smectite clay is mixed with an aqueous solution of the high molecular weight polymeric cationic hydroxy metal complex, polymer or copolymer such that the weight ratio of clay to metal complex is from 3 to 1.

In the method of Vaughan et al., an expandable layer-type clay (smectite) is reacted with a polymeric cationic hydroxy metal complex of aluminum and/or zirconium. Upon calcination, the interlayered metal complex is decomposed to form "inorganic oxide pillars" between the expanded clay layers which are separated by a distance of about 6 to 16 Å. The resulting pillared interlayered clay products are said to possess a unique interconnected internal micropore structure in which more than half of the pores are less than about 30 Å in diameter.

Apparently, while the interlayered clay products possess some degree of ion exchange capacity, the ion exchange capability of the calcined interlayered clay product is not equivalent to the ion exchange capacity of the parent clay. In U.S. Pat. No. 4,271,043, Vaughan et al. describe a method for increasing the ion exchange capacity of such pillared interlayered clays which comprises treating the calcined product with a base, such as aqueous solutions of alkali metal or ammonium hydroxides or carbonates, or a gaseous basic reactant such as ammonia.

U.S. Pat. No. 4,238,364 to Shabtai describes cracking catalysts consisting of highly acidic forms of cross-linked smectites. The preferred method of preparation for these catalysts includes preparing acidic forms of the smectite (usually montmorillonite) and thereafter performing a non-stoichiometric (i.e., partial) cross-linking of the acidic smectite with oligomeric species of aluminum hydroxide. The cross-linked material is subsequently stabilized by heat treatment.

The process described in U.S. Pat. No. 4,238,364 "is performed with preservation of the structure of the smectite unit layers, as the cross-linking step affects only the interlamellar space of the smectite. This is fundamentally different from the methods used in the preparation of clay-based and clay/gel-based zeolite cracking catalysts, since in these cases the clay (smectite) structure is subjected to drastic structural changes during the catalyst preparation process." (col. 4, lines 25-32)

Shabtai describes the preparation and properties of non-functionalized cross-linked frameworks in U.S. Pat. No. 4,216,188. The process of preparing the cross-linked montmorillonite molecular sieves comprises interaction between montmorillonite, in the form of a colloidal solution containing fully separated unit layers, and a cross-linking agent, consisting of a buffered and aged colloidal solution of a metal hydroxide, dispersed in the form of low molecular weight oligomers.

SUMMARY OF THE INVENTION

Heretofore, only clays that swell in water, the so-called smectites, have been pillared. There exist, however, large classes of layered compounds which do not swell in water. Using the methods of the prior art, it has been difficult, if not impossible, to pillar these materials.

The process of the present invention provides a method for pillaring layered materials which do not swell appreciably in water. The process comprises first intercalating an amine or other neutral molecule such as an amide or dimethyl sulfoxide between the layers of the material to be pillared. This allows the subsequent incorporation of inorganic pillars which are more temperature stable than the intercalated amine.

By employing the process disclosed and detailed by the present invention, a pillared composition is produced. The pillared compositions do not appreciably swell in water. Thus, during the process of this invention, the starting composition is swollen with an organic intercalate and the inorganic intercalate is displaced with an inorganic pillaring substance.

Yet another embodiment of the invention is a pillared composition comprising layers of a group IV A or IV B phosphate, alkali titanate, titanium niobate, alkaline niobate, alkaline earth niobate, antimonate, manganate, silicate, or metal oxide separated by a pillaring substance, wherein said pillaring substance is selected from the group consisting of aluminum polymer, zirconium polymer, chromium polymer and bismuth polymer.

A further embodiment of this invention is the pillared composition of layers of group IV A or IV B phosphate separated by a pillaring substance, wherein said pillaring substance is selected from the group consisting of aluminum polymer, zirconium polymer, chromium polymer and bismuth polymer.

The pillared composition of layered group IV A or IV B phosphate is further selected from the group consisting of titanium phosphate, zirconium phosphate, cerium phosphate, thorium phosphate, germanium phosphate, tin phosphate, lead phosphate, silicon phosphate and vanadium(IV) phosphate.

Yet another embodiment of the invention is the pillared composition of layered group IV A and IV B phosphate further selected from the group consisting of hydroxy titanium phosphate, hydroxy zirconium phosphate, hydroxy cerium phosphate, hydroxy thorium phosphate, hydroxy germanium phosphate, hydroxy tin phosphate, hydroxy lead phosphate, hydroxy silicon phosphate, and hydroxy vanadium(IV) phosphate. Another embodiment of this invention is the pillared composition of zirconium phosphate that is a semi-crystalline $\alpha$-zirconium phosphate, as well as the pillared composition of titanium phosphate that is a semicrystalline $\alpha$-titanium phosphate.

Further embodied in this invention is the pillared composition of layers of group IV A or IV B phosphate are separated by said pillaring substance aluminum polymer. This pillared composition is further defined as:

a) $A[Al_{13}O_4(OH)_{24}(H_2O)_{12}]_a{}^{7+}(HPO_4)_b(PO_4)_d \cdot xH_2O$, where $b+d=2$, $7a+b=2$, $x=0$ - $10$ and A is selected from the group consisting of titanium, zirconium, cerium, thorium, germanium, tin, lead, silicon, and vanadium(IV);

b) $A[Al_{13}O_4(OH)_{24+n}(H_2O)_{12-n}]_a{}^{(7-n)}(HPO_4)_b(PO_4)_d \cdot xH_2O$, where $b+d=2$, $(7-n)a+b=2$, $x=0$ - $10$ and A is selected from the group consisting of titanium, zirconium, cerium, thorium, germanium, tin, lead, silicon, and vanadium(IV);

c) $A(Al_2O_3)_{13a/2}(HPO_4)_2$, where A is selected from the group consisting of titanium, zirconium, cerium, thorium, germanium, tin, lead, silicon, and vanadium(IV);

d) $A[Al_{13}O_4(OH)_{24}(H_2O)_{12}]_a(OH)_c(HPO_4)_b(PO_4)_2 \cdot xH_2O$, where $c/2+b=2$, $c/2+b=2$, $x=0$ - $10$ and A is selected from the group consisting of titanium, zirconium, cerium, thorium, germanium, tin, lead, silicon, and vanadium(IV); or e) $A[Al_3O_4(OH)_{24+n}(H_2O)_{12}]_a{}^{(7-n)+}(OH)_c(HPO_4)_b(PO_4)_d \cdot xH_2O$, where $c/2+b+d=2$, $(7-n)a+b+c/2=2$, $x=1$ - $10$, and A is selected from the group consisting of titanium, zirconium, cerium, thorium, germanium, tin, lead, silicon, and vanadium(IV).

More particularly, the above pillared composition is further defined as a) $Zr(Al_2O_3)_{0.8125}(HPO_4)_2$; b) $Ti(OH)_{0.96}(PO_4)_{1.52}[Al_{13}O_4(OH)_{24}(H_2O)_{12}]_{0.216} \cdot xH_2O$; c) $Ti(OH)_{0.96}(PO_4)_{1.52}[Al_{13}O_4(OH)_{24}(H_2O)_{12}]_{0.216} \cdot 5H_2O$;

d) $Zr(Al_{13}O_4(OH)_{24}(H_2O)_{12})_{0.125}$ $(HPO_4)_{1.125}$-$(PO_4)_{0.875}\cdot 6H_2O$; or e) $Zr(Al_{13}O_4(OH)_{24})_{0.125}$ $(HPO_4)_{1.125}(PO_4)_{0.875}$.

Yet another embodiment of the invention, is the pillared composition of layers of alkali titanate separated by a pillaring substance, wherein said pillaring substance is selected from the group consisting of aluminum polymer, zirconium polymer, chromium polymer and bismuth polymer. This pillared composition of alkali titanate is further defined as $M_2Ti_nO_{2n+1}$, wherein M is $Tl^+$, $H^+$ or an alkali metal such as $Li^+$, $Na^+$, $K^+$, $Rb^+$, or $Cs^+$ and $n = 2 - 20$. More particularly, the pillared composition of alkali titanate is further defined as $M_2Ti_2O_5$, $M_2Ti_3O_7$, $M_2Ti_4O_9$, $M_2Ti_5O_{11}$, or $M_2Ti_7O_{15}$.

Yet another embodiment of the invention is the pillared composition of layers of alkali titanate separated by said pillaring substance aluminum polymer. This pillared composition is further defined as: a) $[M_{2-(7-b)a}Ti_n(Al_{13}O_4(OH)_{24+b}(H_2O)_{12-b}]^{(7-b)+}O_{2n+1}\cdot xH_2O]$ where $b = 0 - 3$, $n = 2 - 10$, $x = 0 - 6$, $(7-b)a = 0 - 2$, and M is $Tl^+$, $H^+$ or an alkali metal such as $Li^+$, $Na^+$, $K^+$, $Rb^+$, or $Cs^+$; or b) $M_2Ti_n(Al_2O_3)_{13a/2}O_{2n+1}$, where $n = 2 - 10$ and M is $Tl^+$, $H^+$ or an alkali metal such as $Li^+$, $Na^+$, $K^+$, $Rb^+$, or $Cs^+$.

Also embodied in this invention is the pillared composition of layers of titanium niobate separated by a pillaring substance, wherein said pillaring substance is selected from the group consisting of aluminum polymer, zirconium polymer, chromium polymer and bismuth polymer. This pillared composition is further defined as $M(Ca_{2+n})Nb_3Ti_nO_{10+3n}$ where $n = 1 - 3$ or $M(Ca_2Sr_{n/2})Nb_3Ti_{n/2}O_{10+3n/2}$ where $n = 0.5 - 1$ and M is a univalent ion such as $K^+$, $Rb^+$, $Cs^+$, $Tl^+$, $Li^+$, $Na^+$, $H^+$, or $Ag^+$. More particularly, this pillared composition can be further defined as $KCa_2Nb_3O_{10}$, $KCa_3Nb_3TiO_{13}$, $MTiNbO_5$, $M_3Ti_5NbO_{14}$, or $MTi_2NbO_7$.

Also embodied in this invention, is the pillared composition of layers of titanium niobate separated by said pillaring substance aluminum polymer. This embodiment is further defined as a) $[M_{1-(7-b)a}Ca_{2+n}Nb_3Ti_n$-$[Al_{13}O_4(OH)_{24+b}(H_2O)_{12-b}]_a^{(7-b)+}O_{10+3n/2}\cdot xH_2O]$ where $n = 0 - 2$, $b = 0 - 3$, $x = 0 - 10$, $(7-b)a = 0 - 1$ and M is a univalent ion such as $K^+$, $Rb^+$, $Cs^+$, $Tl^+$, $Li^+$, $Na^+$, $H^+$, or $Ag^+$; or b) $M_2Ca_{2+n}Nb_3Ti_n(Al_2O_3)_{13a/2}O_{10+3n/2}$ and M is a univalent ion such as $K^+$, $Rb^+$, $Cs^+$, $Tl^+$, $Li^+$, $Na^+$, $H^+$, or $Ag^+$.

Further embodied in this invention, is the pillared composition of layers of alkaline niobate separated by a pillaring substance, wherein said pillaring substance is selected from the group consisting of aluminum polymer, zirconium polymer, chromium polymer and bismuth polymer. This pillared composition is defined as $M(Ca,Sr)_2Na_nNb_{3+n}O_{10+3n}$ where M = a univalent ion $Li^+$, $Na^+$, $K^+$, $Rb^+$, $Cs^+$, $Tl^+$, $Ag^+$, or $H^+$ and $n = 1 - 4$.

Also embodied in this invention is the pillared composition of layers of antimonate separated by a pillaring substance, wherein said pillaring substance is selected from the group consisting of aluminum polymer, zirconium polymer, chromium polymer and bismuth polymer. This pillared composition is further defined as $MSbO_3\cdot xH_2O$ where M is a univalent ion $K^+$, $Rb^+$, $Cs^+$, $Tl^+$, $Li^+$, $Na^+$, $H^+$, or $Ag^+$ and $x = 0 - 6$. More particularly, this pillared composition is further defined as $MSb(PO_4)_2\cdot xH_2O$ where M is a univalent ion $K^+$, $Rb^+$, $Cs^+$, $Tl^+$, $Li^+$, $Na^+$, $H^+$, or $Ag^+$ and $x = 0 - 6$; $H_3Sb_3P_2O_{14}\cdot xH_2O$ where $x = 0 - 6$; or $M_3Sb_3P_2O_{14}$, where M is a univalent ion $K^+$, $Rb^+$, $Cs^+$, $Tl^+$, $Li^+$, $Na^+$, $H^+$, or $Ag^+$.

Further embodied in this invention, is the pillared composition of layers of manganate separated by a pillaring substance, wherein said pillaring substance is selected from the group consisting of aluminum polymer, zirconium polymer, chromium polymer and bismuth polymer. This pillared composition of manganate is defined as $MMnO_2$, $M_{0.7}MnO_2$, or $M_{0.7}MnO_{.25}$, where M is a univalent ion $K^+$, $Rb^+$, $Cs^+$, $Tl^+$, $Li^+$, $Na^+$, $H^+$, or $Ag^+$.

Another embodiment of this invention, is the pillared composition of layers of silicate separated by a pillaring substance, wherein said pillaring substance is selected from the group consisting of aluminum polymer, zirconium polymer, chromium polymer and bismuth polymer. This pillared composition of silicate is defined as $M_2Si_{14}O_{29}$, where M is a univalent ion $K^+$, $Rb^+$, $Cs^+$, $Tl^+$, $Li^+$, $Na^+$, $H^+$, or $Ag^+$.

Yet another embodiment of this invention is the pillared composition of layers of metal oxide separated by a pillaring substance, wherein said pillaring substance is selected from the group consisting of aluminum polymer, zirconium polymer, chromium polymer and bismuth polymer. This pillared composition of metal oxide is selected from a group consisting of $V_2O_5$, $MoO_3$, $WO_3$, $UO_3$ and $Ag_6Mo_{10}O_{33}$.

BRIEF DESCRIPTION OF THE DRAWINGS

FIG. 2 shows the indexing of the first five reflections in the x-ray powder diffraction pattern of an α-zirconium phosphate which was prepared by refluxing the amorphous gel for 48 hours in 12-molar phosphoric acid. The first peak, labeled "002", represents the interlayer spacing.

FIG. 3 depicts the x-ray powder diffraction pattern of three α-zirconium phosphates pillared with the aluminum Keggin ion. Curve a corresponds to a product prepared from an α-zirconium phosphate obtained by refluxing the amorphous gel for 15 hours in 12-molar phosphoric acid. This product exhibited a surface area (degassed at 200° C.) of 30 m²/g. Curve b corresponds to a product prepared from an α-zirconium phosphate obtained by refluxing the amorphous gel for 336 hours in 12-molar phosphoric acid. This product exhibited a surface area (degassed at 200° C.) of 35 m²/g. Curve c corresponds to a product prepared from an α-zirconium phosphate obtained by refluxing the amorphous gel for 48 hours in 9-molar phosphoric acid. This product exhibited a surface area (degassed at 200° C.) of 37 m²/g.

FIG. 5 shows a portion of the x-ray powder diffraction patterns of various pillared γ-titanium phosphates.

FIG. 8 is an $^{27}$Al NMR spectrum of a 10% by weight solution of aluminum chlorhydrate which was prepared approximately one month prior to the date on which this spectrum was obtained.

DETAILED DESCRIPTION

Figure 1:
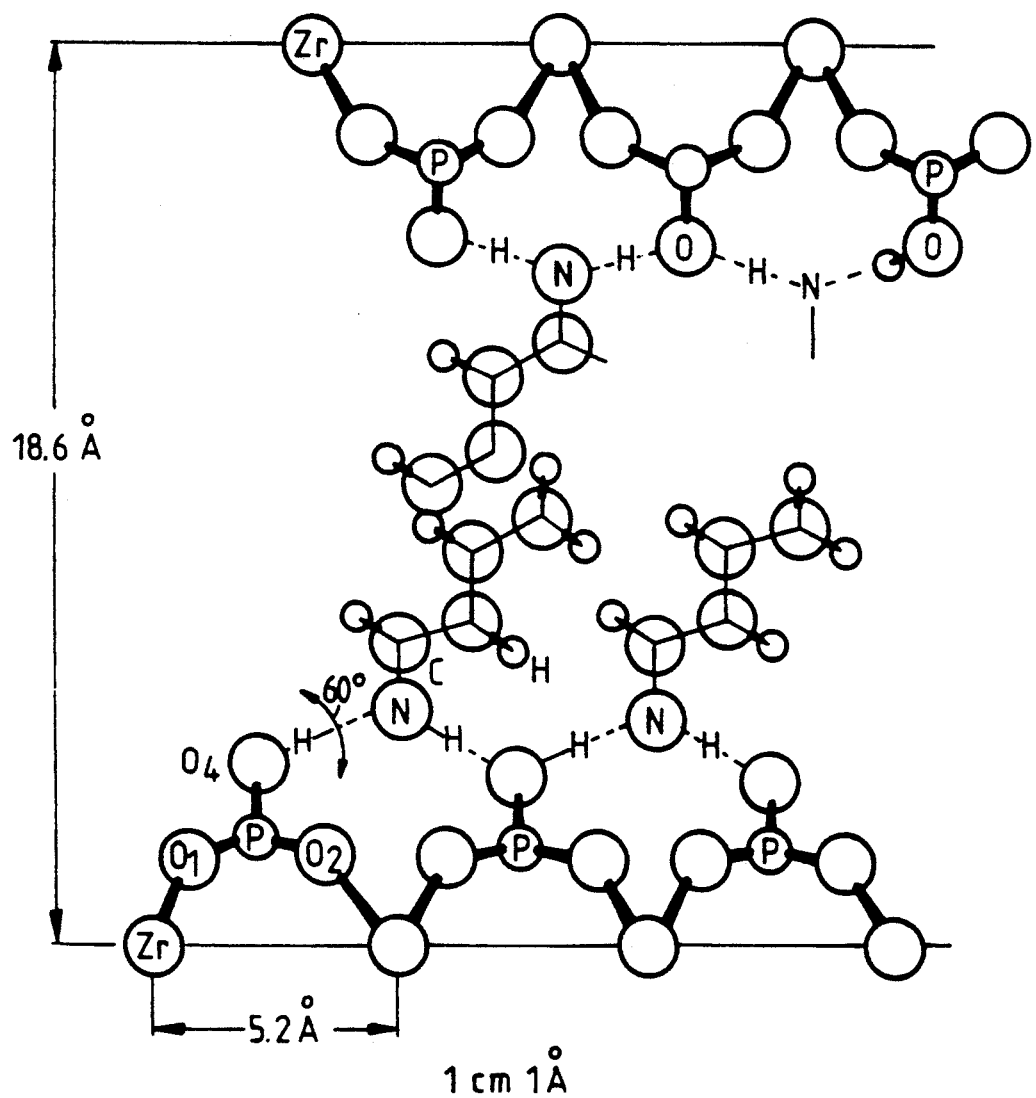
FIG. 1 is a schematic representation of a butylamine intercalate of α-zirconium phosphate having the formula: $(CH_3(CH_2)_3NH_3^+)_2Zr(PO_4^-)_2$.

The method of producing the novel pillared materials of the present invention generally comprises: (1) preparing the layered compound in the proton form so that it will accept amines; (2) intercalating an amine (or dimethyl sulfoxide or amide) between the layers so as to increase the interlayer distance; (3) incorporating a polyoxycation which serves as a pillar; and, (4) recovering the pillared species, e.g., by filtration or centrifugation. The pillared product may subsequently be heat treated to remove excess water.

Examples of layered materials which do not swell appreciably in water and which have potential utility as catalysts include:

Layered group IV phosphates of titanium, zirconium, cerium, thorium, germanium, tin, lead, and vanadium-(IV) phosphates;

2. Layered titanates having the composition $M_2Ti_2O_5$, $M_2Ti_3O_7$, $M_2Ti_4O_9$, $M_2Ti_5O_{11}$, $M_2Ti_7O_{15}$, etc.;

3. Layered titanium niobates such as $MTiNbO_5$, $M_3Ti_5NbO_{14}$, $MTi_2NbO_7$, etc. where M is a univalent cation such as $Li^+$, $Na^+$, $K^+$, $NH^+$, and the like; For the purpose of this invention, alkaline earth niobate include magnesium, calcium, strontium, and barium and alkaline niobates are sodium, lithium, potassium, cesium and rubidium.

4. Antimonates such as $KSbO_3 \cdot xH_2O$ and $H_3Sb_3P_2O_{14} \cdot H_2O$ and comparable niobates;

5. Manganates such as $NaMnO_2$, $Na_{0.7}MnO_2$ and $Na_{0.7}MnO_{2.25}$;

6. Layered silicates such as magadiite, $H_2Si_{14}O_{29}$, and clays which do not swell appreciably in water; and, 7. Other layered oxides such as $V_2O_5$, $MoO_3$, $WO_3$ and $UO_3$ and their derivatives such as $Ag_6Mo_{10}O_{33}$.

The cationic compounds are preferably first treated with dilute acid to convert them to the protonated or hydronium ion form. They are then contacted with an amine or any compound which will intercalate between the layers of the layered material and separate the layers. To incorporate the pillars, the intercalated material is subsequently contacted with a solution comprising the polyoxycation. While not wishing to be held to any particular theory, it is contemplated that this reaction takes place via an ion exchange mechanism. In the case of intercalated amines, it is further contemplated that an ammonium ion, $RNH_3^+$, is formed upon intercalation and this ammonium ion exchanges with the polyoxycation.

Particularly preferred swelling agents for proton-containing layered phases are polyether amines having the general formula:

where $n=4$ or greater. The polyether portion of such molecules is extremely hydrophilic. Thus, when such amines are intercalated into layered materials, water diffuses in and spreads the layers even further apart.

Examples of cations which are considered suitable include:

1. Aluminum polymers such as $[Al_{13}O_4(OH)_{24} \cdot 12H_2O]^{7+}$;
2. The zirconium tetramer $[Zr(OH)_2 \cdot 4H_2O]_4^{8+}$;
3. Chromium polymeric species such as $Cr_2(OH)_2^{4+}$ and $Cr_3(OH)_4^{5+}$; and,
4. Bismuth polymers such as $[Bi_6O_4(OH)_4]^{6+}$.

The following examples illustrate the process as applied to α-titanium and zirconium phosphates, Ti(H-$PO_4)_2 \cdot H_2O$ and $Zr(HPO_4)_2 \cdot H_2O$, and γ-zirconium and titanium phosphate, $Zr(HPO_4)_2 \cdot 2H_2O$ and $Ti(HPO_4)_2 \cdot H_2O$. These materials were prepared by the methods described in U.S. Pat. No. 3,416,884, Clearfield et al., J. Phys. Chem., 73 3424 (1969) and Clearfield et al., J. Inorg. Nucl. Chem., 30 2249 (1968), the teachings of which are incorporated by reference. The x-ray powder patterns reported herein were obtained with CuKα radiation on a Seifert-Scintag PAD-II automated powder diffractometer.

FIG. 1 is a schematic drawing of α-zirconium (α-ZrP) or titanium phosphate (α-TiP) with butylamine intercalated between the layers. In this condition the layers are 18.6 Å apart, whereas the interlayer distance without the amine present is 7.6 Å.

Table 1 gives a partial listing of the x-ray diffraction powder pattern of α-zirconium phosphate, $Zr(HPO_4)_2 \cdot H_2O$, (Column A) and its butylamine intercalate (Column B), $[CH_3(CH_2)_3NH_3^+]_2Zr(PO_4)_2$. Each of the powder patterns consists of the d-spacings in Å and their relative intensities (relative to the highest peak) I/Io. A portion of the x-ray pattern of α-zirconium phosphate which corresponds to the Table is shown in FIG. 2. The first listed d-spacing of layered compounds is usually the interlayer spacing and bears an index of (002), and this is true in the present case. The value of the interlayer spacing of α-zirconium phosphate is seen to be 7.6 Å and that of its butylamine intercalate (Column 1B) 18.6 Å.

TABLE 1

X-ray Diffraction Powder Patterns of a-Zirconium Phosphate (A) and the a-ZrP n-Butylamine Intercalate (B)

| a-ZrP | | | a-ZrP/n-butylamine | | |
|---|---|---|---|---|---|
| d(A") | I/Io (× 100) (A) | Index (hkP) | d(A") | I/Io (× 100) (B) | Index (hkP) |
| 7.56 | 75 | (002) | 18.6 | 100 | (002) |
| 4.48 | 40 | (110) | 9.33 | 10 | (004) |
| 4.45 | 25 | (202) | 6.20 | 3.5 | |
| | (006) | | | | |
| 3.57 | 100 | (112) | 4.61 | 4.5 | (008) |
| 3.52 | 55 | (604) | 4.54 | 4.0 | |
| 3.29 | 5 | | 4.08 | 3.5 | |
| 3.21 | 5 | | 4.0 | 3.5 | |
| 3.08 | 5 | | 3.64 | 2.5 | |
| 3.02 | 2 | | 2.65 | 7.0 | |
| 2.63 | 30 | | | | |
| 2.61 | 35 | | | | |

FIG. 3 shows the x-ray diffraction patterns of three α-zirconium phosphates after each has been pillared using an aluminum hydroxychloride solution. The distinct crystalline pattern as seen in FIG. 2 is no longer evident as the layers become somewhat disordered by the intrusion of the large aluminum polymer. Nevertheless, the first peak is still that of the interlayer spacing. It is seen in curve c that this value is 14.2 Å. Thus, the original value of 7.6 Å has been increased by the aluminum pillars to a value of 14.2 Å.

Figure 4A:
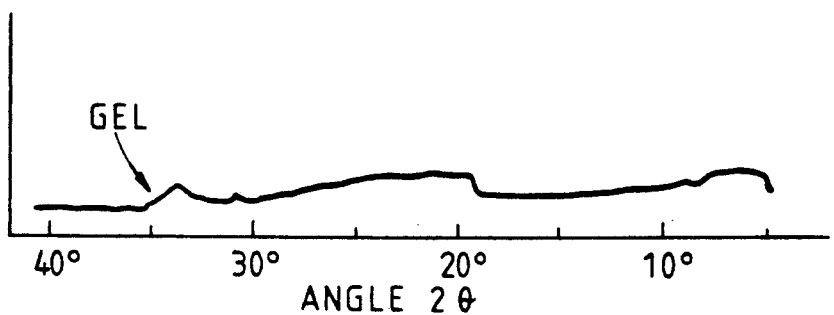
FIG. 4B shows a portion of the x-ray powder diffraction patterns of an α-zirconium phosphate in various stages of crystal growth starting with the amorphous gel whose x-ray pattern is shown in FIG. 4A. Each of the samples in FIG. 4B were prepared by refluxing the amorphous gel for 48 hours in phosphoric acid. The particular acid concentration employed for each sample is indicated with an arrow for each individual panel corresponding to that sample.
Figure 4B:
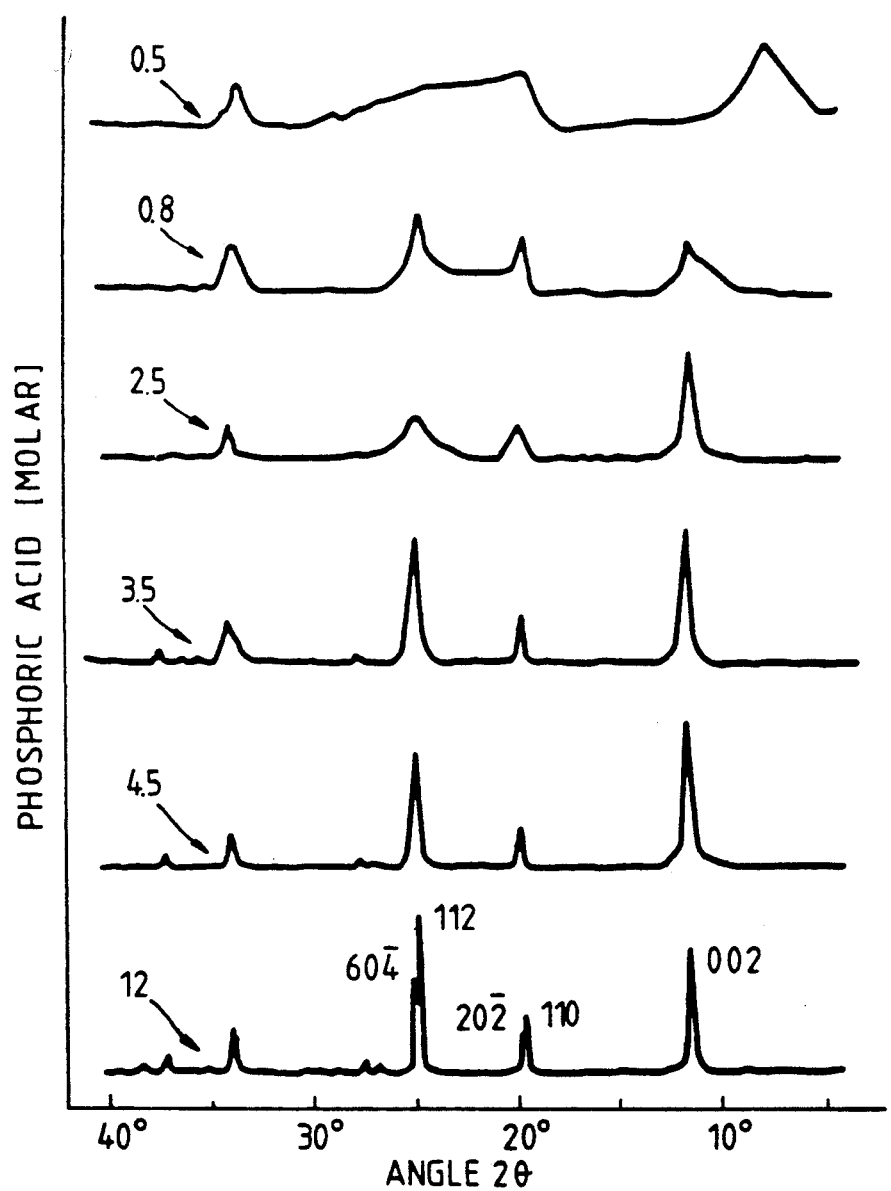

X-ray patterns labelled b and a in FIG. 3 are those of other samples of pillared α-zirconium phosphate. It is contemplated that the apparent differences may be the result of different crystallinities of the original zirconium phosphate. In preparing α-zirconium phosphates a soluble zirconium salt is added to phosphoric acid, $H_3PO_4$, to yield a gel whose x-ray pattern is shown in FIG. 4 (labelled "Gel"). This pattern is typical of a noncrystalline (or amorphous) product. If the gel is then refluxed in a phosphoric acid solution, it will crystallize slowly. Complete crystallinity requires refluxing in 12M $H_3PO_4$ for more than 400 hours. The different degrees of crystallinity obtained by the reflux treatment are shown in FIG. 4B. The number used to identify each pattern is the concentration (in moles per liter) of $H_3PO_4$ used to prepare the material. Each sample was refluxed for 48 hours.

EXAMPLE I

γ-Titanium phosphate has the formula $Ti(HPO_4)_2 \cdot 2H_2O$ and an interlayer spacing of 11.9 Å. Its x-ray powder diffraction pattern is tabulated in Table 2A. One gram of the microcrystalline α-titanium phosphate was shaken with a 3.8% by weight solution of the polymeric aluminum cation $[Al_{13}O_4(OH_{24} \cdot 12H_2O)]^{7+}$ (the "Keggin ion") for three hours. The solution comprising the polyoxycation was prepared as described below. The x-ray diffraction pattern of the solid recovered at the end of the three hour shaking period was the same as that shown in Table 2A. Thus, no pillaring of the layers occurred.

TABLE 2

X-ray Diffraction Powder Patterns of (A) q-Titanium Phosphate (q-TiP), (B) Its Butylamine Intercalate and (C) q-TiP Pillared With the $Al_{13}$ Keggin Ion

| γ-TiP | | γ-TiP/n-butylamine | | γ-TiP/Al$_{13}$ | |
|---|---|---|---|---|---|
| d(Å) | I/Io (× 100) (A) | d(Å) | I/Io (× 100) (B) | d(Å) | I/Io (× 100) (C) |
| 11.9 | 100. | 20.3 | off-scale | 15.5 | 100 |
| 5.78 | 0.15 | 10.15 | 100. | 8.8 | 30 |
| 5.56 | 2.9 | 6.77 | 5.3 | | |
| 4.30 | 4.0 | 4.98 | 3.0 | | |
| 3.95 | 0.10 | 4.07 | 22.5 | | |
| 3.86 | 1.0 | 3.87 | 5.5 | | |
| 3.56 | 0.25 | 3.81 | 5.4 | | |
| 3.45 | 14.0 | 3.77 | 10.5 | | |
| 3.30 | 0.85 | 3.41 | 9.8 | | |
| 3.17 | 0.50 | 3.36 | 7.5 | | |
| 3.06 | 0.50 | 3.34 | 13.0 | | |
| 3.03 | 1.8 | 2.54 | 7.5 | | |
| 2.79 | 1.5 | 2.26 | 6.0 | | |

There are at least two methods by which the large $Al_{13}$ Keggin ion used to pillar layered compounds may be prepared. In one such method, sodium hydroxide (NaOH) is added to a solution of aluminum chloride ($AlCl_3$). In another method, aluminum hydroxide ($Al(OH)_3$) is dissolved in $AlCl_3$. The latter method is preferred inasmuch as it avoids the introduction of sodium ions ($Na^+$) into the system. Since sodium ions are preferentially exchanged by the amine-intercalated zirconium or titanium phosphate, once they displace the amine, no pillaring takes place.

Figure 6:
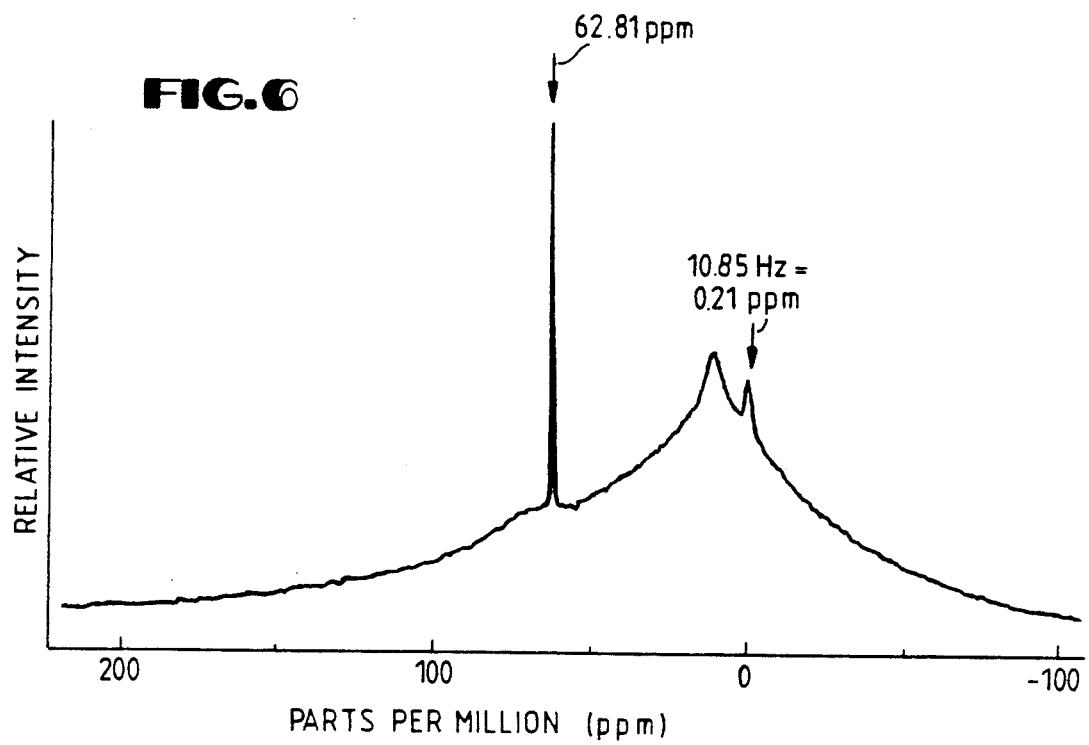
FIG. 6 is an $^{27}Al$ NMR spectrum of a 50% by weight solution of aluminum chlorhydrate diluted 1:5 in $D_2O$.
Figure 7:
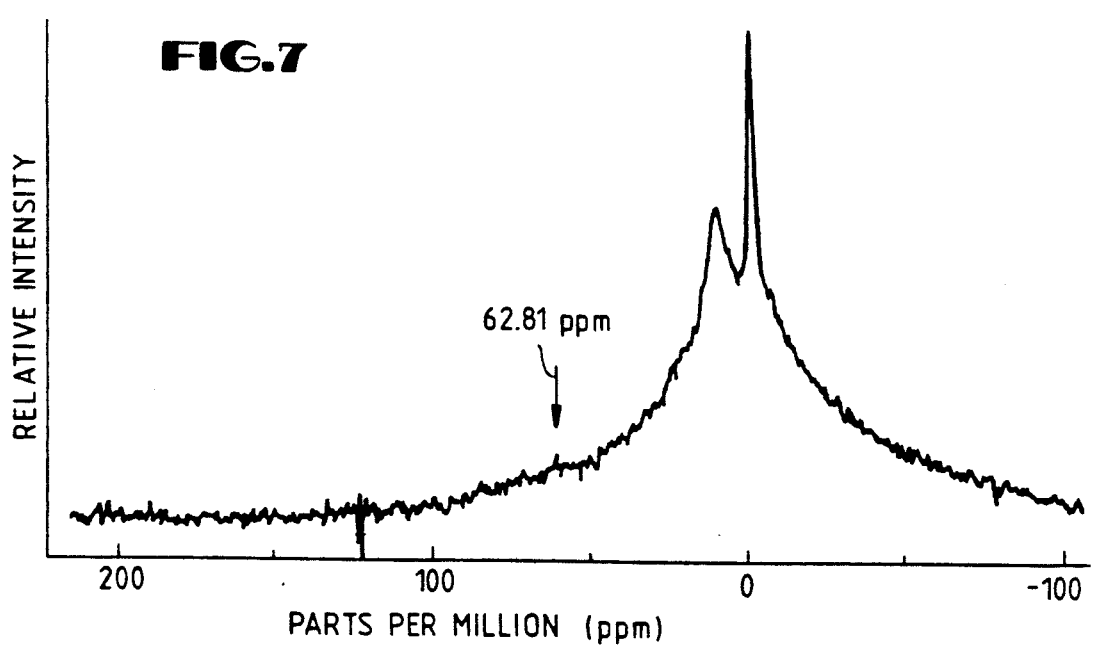
FIG. 7 is an $^{27}$Al NMR spectrum of a 50% by weight solution of aluminum chlorhydrate which was prepared approximately six months prior to the date on which this spectrum was obtained.

In all examples disclosed herein, the polyoxycation was prepared from an aluminum chlorhydrate solution obtained by dissolving a commercially available powder known as MICRO-DRY® in water. MICRO-DRY® is a registered trademark of the Armour Pharmaceutical Co. d.b.a. Reheis Chemical Company, Chicago, Ill. A typical lot analysis indicates that MICRO-DRY® aluminum chlorhydrate as a solid contains about 46.2% $Al_2O_3$ and about 16.4% $Cl^-$ (Al:Cl = 1.96:1). The pH of a 15% solution is between 4.0 and 4.4. MICRO-DRY® has the approximate formula: $Al_2(OH)_5Cl \cdot nH_2O$. The $^{27}Al$ NMR spectrum of a freshly prepared 50% solution of MICRO-DRY® diluted 1:5 in $D_2O$ is shown in FIG. 6. This spectrum, as well as the NMR spectra shown in FIGS. 7 and 8, is referenced to sodium aluminate, $Na^+ Al(OH)_4^-$ in solution. The peak at 63ppm is due to the Keggin ion $[Al_{13}O_4(OH)_{24} \cdot 12H_2O]^{7+}$ and that at −0.2 ppm results from the presence of the monomeric species $Al(H_2O)_6^{3+}$. The peak intensity (actually the area under the peak) corresponds to the amount of each species present in the sample. Although the intensities of the two peaks are approximately the same, much more aluminum is present in the form of Keggin ion inasmuch as there are 13 aluminum atoms in each Keggin ion as opposed to one aluminum atom in each $Al^{3+}$ ion.

The large hump in the spectrum which has a maximum at about 13 ppm is thought to be due to the presence of a series of polymers ranging from the dimer upward beyond the $Al_{13}$ Keggin ion. The maximum at 13ppm is believed to correspond to the dimer, $[Al_2(OH)_2]^{4+}$. As the solution ages, the concentration of the Keggin ion decreases while the concentration of other aluminum species increases until (as shown in FIG. 7) the Keggin ion is barely present. FIG. 7 is an $^{27}Al$ NMR spectrum of a 50% solution of MICRO-DRY® aluminum chlorhydrate which has aged six months. Note that the signal corresponding to the Keggin ion is almost gone and those corresponding to other species have increased significantly. This process may take a week to several months.

It has been found, however, that when the concentration of MICRO-DRY® aluminum chlorhydrate solutions is limited to a maximum of about 10% by weight, the major species is the Keggin ion and, even more importantly, such solutions remain stable for at least nine months. Practically no variation in the relative amounts of the aluminum species present was observed by $^{27}Al$ NMR over this period of time. Moreover, subsequent dilution of such solutions did not produce a change in the relative concentration of the Keggin ion.

FIG. 8 is the $^{27}Al$ NMR spectrum of a 10% MICRO-DRY® aluminum chlorhydrate solution which has been aged one month. Note that the major peak in the spectrum is that corresponding to the Keggin ion and that there is very little contribution from other aluminum species. It has been observed that after a period of nine months, there are no appreciable changes in the spectrum.

EXAMPLE II

The experiment reported in Example I, above, was repeated but with the shaking performed at an elevated temperature (70° C.). Again, no incorporation of the aluminum cation between the layers of the γ-titanium phosphate was observed.

EXAMPLE III

One gram of γ-titanium phosphate having a surface area of 2 m²/g was added to 100 milliliters of 0.1M aqueous n-butylamine solution. This mixture was shaken at room temperature for four hours. The x-ray powder diffraction pattern of the filtered and washed solid resulting from this treatment is tabulated in Table 2B. The x-ray pattern shows that the amine has been intercalated between the layers of the γ-titanium phosphate as a bilayer such as shown in FIG. 1. However, the interlayer spacing in the γ-phase is 20.3 Å.

Butylamine readily intercalates into the layered group IV phosphates to the extent of two moles per formula weight of phosphate. In the process, the interlayer spacing increases from 7.6 to 18.6 Å in the α-zirconium and titanium phosphates and from about 12 to 20.3 Å for the γ-phases. This increase in interlayer spacing then allows the exchange of polymeric aluminum species for alkyl ammonium ions to take place.

Sixteen milliliters of a 15% by weight aluminum hydroxychloride solution were subsequently added to a slurry of the intercalated solid γ-titanium phosphate (1 g in 35 ml water). This mixture was maintained at 70° C. for 90 minutes and then cooled to room temperature, filtered, washed and air dried. The resultant product contained 15% Al and exhibited a surface area of 82 $m^2/g$ (by $N_2$ BET sorption) after dewatering in a vacuum at 270° C. The x-ray powder diffraction pattern of this material is shown in FIG. 5 and tabulated in Table 2C. The first reflection is $d_{002}$ and represents the interlayer spacing produced by the pillaring. It will be noted that this value (15.5 Å) indicates an expanded size as compared to the interlayer spacing of the untreated material (11.9 Å). Thus, from the interlayer spacing and the increase in surface area, it is readily apparent that aluminum cations were incorporated between the layers. However, the pillaring process disorders the layers resulting in broadened peaks of low intensity. This is also true of the pillared clays.

EXAMPLE IV

α-Titanium phosphate, α-Ti(HPO$_4$)$_2$·H$_2$O, having an interlayer spacing of 7.6 Å and a surface area of 2 $m^2/g$ was treated with butylamine by the method described in Example III. After shaking for one hour the solid was filtered off and added to 30 milliliters of a 30% aqueous aluminum hydroxychloride solution and the mixture heated at 70° C. for 90 minutes. Six milliliters of a 30% aluminum hydroxychloride solution were added to this slurry and the mixture heated at 70° C. for 90 minutes. X-ray data for the α-TiP and its butylamine intercalate are given in Table 3.

The resulting washed and air-dried solid was found to contain 10.9% Al and to have a surface area of 139 $m^2/g$. After heating to 300° C. for two hours, the surface area was found to be 95 $m^2/g$, indicating that the porosity was retained to a large extent. The x-ray powder diffraction patterns of the untreated α-titanium phosphate, the butylamine intercalate, and the aluminum-pillared product are tabulated in Table 3. The increased interlayer spacing of the aluminum-containing product and its increased porosity relative to that of the starting material indicate that pillaring has obtained. (See FIG. 5.)

TABLE 3

X-ray Diffraction Powder Patterns of (A) a-Titanium Phosphate (a-TiP) and (B) its n-Butylamine Intercalate

| a-TiP | | a-TiP/n-butylamine | |
|---|---|---|---|
| d(Å) | I/Io (× 100) | d(Å) | I/Io (× 100) |
| (A) | | (B) | |
| 7.59 | 100 | 19.2 | 100 |
| 4.28 | 14 | 9.56 | 16 |
| 4.26 | 14 | 6.36 | 6 |
| 4.07 | 4 | 4.46 | 3 |
| 3.47 | 94 | 4.07 | 4 |
| 3.44 | 55 | 4.05 | 7 |
| 3.17 | 5 | 3.46 | 14 |
| 3.05 | 4 | 3.43 | 9 |
| 2.63 | 7 | | |
| 2.61 | 5 | | |
| 2.54 | 14 | | |
| 2.51 | 16 | | |

EXAMPLE V

One gram of γ-titanium phosphate was treated with 20 milliliters of 1N aqueous butylamine solution for two hours. The solids were subsequently filtered off and added to a solution prepared by diluting 10 milliliters of a 30% aluminum hydroxychloride aqueous solution to 50 milliliters. This mixture was maintained at 70° C. for 90 minutes in a water bath, then filtered and air dried. The resulting product was found to have a 14-angstrom interlayer spacing and a surface area of 121 $m^2/g$ after being dried under vacuum at 200° C.

The dried product sorbed 23% of its weight in water when exposed to the atmosphere (80% relative humidity) and 4.5% of its weight in cyclohexane at 25° C. These results indicate that a pillared product was produced.

EXAMPLE VI

A sample of pillared γ-titanium phosphate prepared as described in Example V (i.e., not heat treated) was found to contain 11% Al and to have a surface area of 52 $m^2/g$. Virtually all the aluminum was extracted upon treatment with 1M HNO$_3$ at 25° C. for 24 hours. However, following this acid treatment the surface area was found to be 91 $m^2/g$, which suggests that removal of the large aluminum cation left considerable void space between the layers. The aluminum-free product was found to have an interlayer spacing of 11.9 Å. After being heated to 33° C. the measured surface area was 73 $m^2/g$.

EXAMPLE VII

One gram of α-zirconium phosphate, Zr(HPO$_4$)$_2$·H$_2$O, having an interlayer spacing of 7.6 Å and the x-ray diffraction pattern shown in Table 1, Column A, was treated at room temperature with 100 milliliters of 0.1M aqueous butylamine solution. Following treatment, the x-ray pattern changed to that shown in Table 1, Column B. The interlayer spacing of the intercalated zirconium phosphate is 18.6 Å.

The solid intercalate was filtered off and added to a solution of 40 milliliters of a 10% aluminum hydroxychloride aqueous solution and heated at 70° C. for two hours. The washed and air-dried product contained 8.3% Al and had an interlayer spacing of 13.6 Å. This is an increase of 6 Å over the original values. The surface area increased from 2 $m^2/g$ to 35 $m^2/g$.

The aluminum content of the pillared zirconium phosphate was found to vary from 5.6% Al to 13% Al, depending upon the concentration of aluminum hydroxychloride used as well as the temperature and length of treatment. Temperatures of about 35° C. to boiling may be used, the preferred temperature range being from about 60° to about 80° C.

The interlayer spacing was also found to vary from 13.0 to 15.1 Å for the o-type compounds. Since the $Al_{13}$ cation (the Keggin ion) has the shape of a prolate spheroid having approximate dimensions of 7×9 Å, when the cation is oriented with its long axis parallel to the layers of the layered material, the interlayer distance is expected to be 13.6 to 14.6 Å and when perpendicular, 15.6 to 16.6 Å.

The smaller dimension results from the fact that the actual thickness of the layer in α-zirconium phosphate is 6.6 Å. The presence of one mole of water between the layers of α-layered compounds accounts for the observed value of 7.6 Å. Thus, the increase in interlayer distance which obtains upon pillaring is close to the expected value.

X-ray diffractograms of some typical products are shown in FIG. 3. Samples a and b fall within the expected range of interlayer spacing, but the pattern for sample c indicates an interlayer spacing of 29.5 Å. It is contemplated that this large spacing is due to a phenomenon known as "staging." In staging, the aluminum cation does not become inserted between each layer, but rather every other layer or every third layer. Thus, the repeat distance is the sum of the pillared and unpillared layers. In the present example, the sum of two non-intercalated layers (7.6×2) plus one pillared layer (approximately 14.3 Å) equals 29.5 Å.

It is possible that sample c may be a mixture which comprises some 100% pillared materials. It is thought that the broad peak observed in the diffractogram at 12.7 to 14 Å is an indication of this possibility.

Analysis of more than a dozen pillared samples of α-zirconium phosphate showed that they contained variable aluminum contents ranging from 7.4% to 13.8% on a dry basis. Moreover, the interlayer spacings varied from 13.0 to 16.1 Å and there was no apparent correlation between the aluminum content and the interlaying d-spacing. However, it was found that when the zirconium phosphate was highly crystalline, there appeared to be a greater tendency to form the products having 24 to 30-angstrom interlayer spacings.

It has been shown that the degree of crystallinity of an α-zirconium phosphate is strongly dependent on the concentration of $H_3PO_4$ in which the gel is refluxed, and on the reflux time. See, e.g., A. Clearfield, Å. Oskarsson and C. Oskarsson, "Ion Exchange and Membranes," 1, 91 (1972). See also A. Clearfield, *Inorganic Ion Exchange Materials,*" A. Clearfield, Ed., CRC Press, Boca Raton, Fla., 1982, pp. 6–16. Refluxing in 12M $H_3PO_4$ for 14 days results in crystallites of 1 to 2 micrometer average size. These crystallites tended to yield pillared products having the larger (27–30 angstrom) interlayer spacings. The less crystalline zirconium phosphate (refluxed in 12M $H_3PO_4$ for 15 hours) yielded products of the type represented by samples a and b in FIG. 3. Surface areas of all the pillared zirconium phosphates were in the range 30 to 35 $m^2/g$ as compared to 1 to 8 $m^2/g$ for the unpillared phosphates. Moreover, the pillared products did not intercalate amines or ammonia, nor did they sorb molecules such as isopropanol into the interlamellar space. This suggests that the zirconium phosphate products are non-porous and the pillars have stuffed the interlamellar regions.

In contradistinction, both α- and γ-titanium phosphate yielded pillared products having surface areas of 50–185 $m^2/g$ and these products sorbed relatively large molecules, as shown in Table 4. The pillared products were degassed at 200° C. for 12 hours prior to exposure to the sorbate. Large amounts of perfluorotributylamine (PFTBA), which has a kinetic diameter of 10 Å, were sorbed. The porous pillared titanium phosphates retained more than 70% of their surface area after heating to 400° C. for 2 hours. Unpillared titanium phosphates condense to amorphous pyrophosphates at this temperature.

TABLE 4

| Sample # | Sample Starting Material[b] | Surface Area[a] | Sorbtion (sampled degassed at 200° C.) | | | | | | | |
|---|---|---|---|---|---|---|---|---|---|---|
| | | | PFTBA | | Cyclohexane | | n-pentane | | $H_2O$ | |
| | | | % wt | P/Po | % wt | P/Po | % wt | P/Po | % wt | P/Po |
| Al #158/9 | γ-TiP (cryst.) | 121 | — | — | 4.47 | 0.60 | — | — | 22.6 | 0.83 |
| Al #188 | α-TiP (12:17) | 169 | 34.0 | 0.74 | 13.0 | 0.58 | 3.70 | 0.57 | — | — |
| Al #199 | α-TiP (2.5:48) | 183 | 36.5 | 0.79 | — | — | — | — | — | — |
| Al #216[d] | α-ZrP (12:15) | 30 | 9.0 | 0.75 | — | — | — | — | — | — |
| Al #217[e] | α-ZrP (12:336) | 35 | — | — | — | — | — | — | — | — |
| Al #219[f] | α-ZrP (9:48) | 37 | — | — | — | — | — | — | — | — |

[a]$N_2$B.E.T.($m^2/g$); degassed at 200° C.
[b]Preparation indicated as: (concentration of phosphoric acid in moles per liter:reflux time in hours)
[d]Sample "a" in FIG. 3
[e]Sample "b" in FIG. 3
[f]Sample "c" in FIG. 3

$^{27}$Al NMR spectra of MICRO-DRY® aluminum Chlorhydrate solutions were similar to those reported by Pinnavaia in *Heterogeneous Catalysis;* Shapiro, B. Ed., Texas A&M University Press, College Station, Tex.; p. 145 (1985) and indicated that the solutions contained appreciable amounts of $Al(H_2O)_6^{3+}$ and polymerized species other than the aluminum Keggin ion. Thus, it is contemplated that while the Keggin ion is one of the pillaring species, other species may also be incorporated, and a combination of Keggin ion pillars and smaller species could be responsible for the stuffed character of the pillared zirconium phosphates.

EXAMPLE VIII

It was found that exchange of $Al(H_2O)_6{}^{3+}$ with the butylamine intercalates of α-zirconium phosphate yielded a product with a 9.4-angstrom interlayer spacing in agreement with the previously obtained $Al^{3+}$ exchange phase. A solution was then prepared which according to $^{27}Al$ NMR spectra contained only the $Al_{13}$ Keggin ion. This was accomplished by electrolytically dissolving aluminum metal in an $AlCl_3$ solution. The end product (the pillared product) also had a 9.4-angstrom interlayer spacing. This suggests a breakdown of Keggin ions to simple $Al^{3+}$ ions and supports the idea that the stuffed condition may result from the pores, formed by the pillars, being filled by smaller species.

An important advantage of the process of the present invention is that relatively concentrated solutions may be used for treating the layered material. In contrast, the processes of the prior art require very dilute solutions. For example, U.S. Pat. No. 4,216,188 states that the concentration of montmorillonite in the starting colloidal solution should be very low, e.g., from about 100 mg/l up to about 800 mg/l. (Column 2, lines 5-10) Thus, the practice of the present invention reduces not only water or other solvent requirements, but also the size of equipment required to produce useful quantities of the pillared product.

EXAMPLE IX

Pillared γ-Titanium Phosphate

One gram of γ-titanium phosphate having a composition of $Ti(HPO_4)_2 \cdot 2H_2O$, and a surface area of 2 $m^2/g$ was added to 100 ml of 0.1M aqueous n-butylamine solution. The mixture was shaken at room temperature for 4 hours. The X-ray powder diffraction pattern of the filtered and washed solid (air dried) resulting from this treatment is tabulated in Table 2B (above). This X-ray pattern shows that the amine has been intercalated between the layers of the γ-titanium phosphate as a bilayer. The interlayer spacing increased from 11.9 Å to 20.3 Å. Sixteen ml. of a 15% by weight aluminum hydroxychloride solution was added to a slurry of the amine intercalated γ-titanium phosphate (1 g in 35 ml of water). This mixture was maintained at 70° C. for 90 min. and then cooled to room temperature, filtered washed and air dried. Elemental analysis gave 15.0% Al and 7.4% Ti which corresponds to a formula of $Ti[Al_{13}O_4(OH)_{24}(H_2O)_{12}]_{0.286}(PO_4)_2 \cdot 7.5H_2O$ (calc: 15.0% Al, 7.2% Ti. After dewatering under vacuum at 270° C. the product exhibited a surface area of 82 $m^2/g$ (by $N_2$ BET sorption) and an interlayer spacing of 15.5 Å as shown by its X-ray diffraction pattern. This value indicates an expanded size as compared to the interlayer spacing of the untreated γ-titanium phosphate, 11.9 Å. Since the layer itself is expected to be about 7 Å thick, the aluminum Keggin ion has created an open space of 8.5 Å between layers.

EXAMPLE X

Pillared γ-Titanium Phosphate

α-titanium phosphate, $\alpha\text{-}Ti(HPO_4)_2 \cdot H_2O$, having an interlayer spacing of 7.6 Å and a surface area of ~2 $m^2/g$ was treated with butylamine by the method described in example I. After shaking for 1 hour the solid was filtered off and added to 30 ml of a 30% aqueous aluminum hydroxychloride solution and the mixture heated at 70° C. for 90 min. The resultant washed and air dried solid had a surface area of 139 $m^2/g$ (dewatered at 200° C.) and contained 10.9% Al and 11.6% Ti. Calculated for $Ti(HPO_4)_{1.12}(PO_4)_{0.88}[Al_{13}O_4(OH)_{24}(H_2O)_{12}] \cdot 2H_2O$: 10.88% Al, 11.8% Ti. After heating at 300° C. for 2 hours the product had a surface area of 95 $m^2/g$ and still had an interlayer spacing of ~14.5 Å. This is 7.9 Å larger than the layer thickness (6.6 Å) and 6.9 Å larger than the original interlayer spacing of 7.6 Å.

EXAMPLE XI

Figure 9:
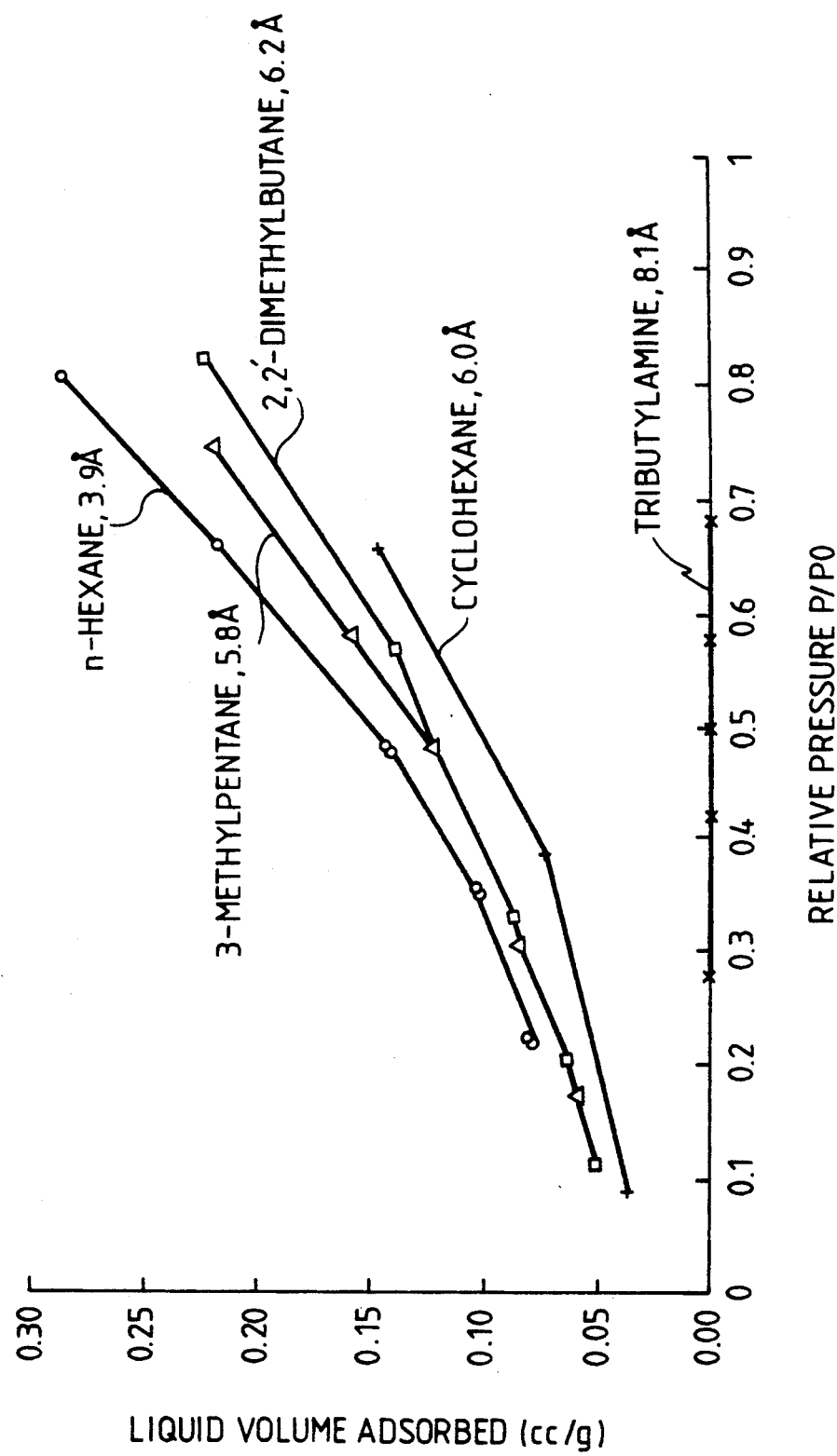
FIG. 9 is sorption curves for molecules of small kinetic diameters by the hydroxy titanium phosphate pillared with the polyoxyaluminum cation. The number next to the compound name is the kinetic diameters of that molecule.

A sample of α-titanium phosphate was prepared by refluxing an amorphous gel in 2.5M $H_3PO_4$. By using dilute phosphoric acid very small crystallites were obtained. 9.8 g of the $Ti(HPO_4)_2 \cdot H_2O$ crystals were slurried in 100 ml of water and added to 100 ml of a 10% solution of butylamine and mixed for 1 hour. The amine intercalated solid was then filtered off washed and reslurried in 300 ml of water. To this slurry was added 120 ml of a 15% solution of aluminum chlorhydrate (Reheis MICRO-DRY ®). The slurry was then kept at ~70° C. for 2h, cooled and the solid filtered off, washed and air dried. Elemental analysis gave 9.1% Ti, 14.2% Al and 27.2% $PO_4$. These values correspond to a formula of $Ti(OH)_{0.48}(PO_4)_{1.52}[Al_{13}O_4(OH)_{24}(H_2O)_{12}]_{0.216} \cdot 5H_2O$ which required 9.3% Ti, 14.7% Al, 28.0% $PO_4$. This solid gave a surface area of 237 $M^2/g$ of surface area after being dewatered at 300° C. in a vacuum. The comparable value obtained by mercury porosimetry was 137 $m^2/g$ which represents the macropores. Thus, 100 $m^2/g$ was due to the presence of micropores less than ~15 Å and meso (20–50 Å) diameter pores. FIG. 9 shows the sorption of molecules of kinetic diameter between 3.2 Å and 8 Å. It is seen that the molecule with a 6.2 Å kinetic diameter was sorbed but that with an 8 Å kinetic diameter was not. Thus, the micropores lie between these values in diameter. Heating the pillared α-titanium phosphate to 350° C. reduced the surface area to 182 $m^2/g$ showing that the porosity is still present. The interlayer spacing after heating to this temperature was ~14 Å larger than the original interlayer distance (7.6 Å) and 7.4 Å larger than the layer thickness (6.6 Å). It should be noted that the amount of phosphate was reduced from 2 moles per mole of Ti to about 1.5 moles.

Analysis of more than a dozen samples of titanium phosphate both α- and γ- showed that the aluminum content could vary from about 6% to 17.9% in the air dried condition and 8% to 28% in the dried (300° C.) condition. Porosity of the products was shown by the data in Table 4 (above).

EXAMPLE XII

Pillared α-Zirconium Phosphate 10 g of α-zirconium phosphate, prepared by refluxing a gel in 9M $H_3PO_4$ for 48 hours and having a composition of $Zr(HPO_4)_2 H_2O$, was slurried in 100 ml of water and 200 ml of 0.5M butylamine solution added rapidly with stirring. The interlayer spacing of the zirconium phosphate increased from 7.6 Å to 18.6 Å as the amine was intercalated. This solid intercalate was filtered off and added to 200 ml of a 10% MI CRO-DRY ® solution and heated at 70° C. for 2 hours. The washed and air dried product contained 8.3% Al and 17.5% Zr. This analysis corresponds to the formula $Zr(Al_{13}O_4(OH)_{24}(H_2O)_{12})_{0.125}(HPO_4)_{1.125}(PO_4)_{0.875} \cdot 6H_2O$. The interlayer spacing was 14.1 Å. On drying at 300° C. for 4 hours the solid lost 26% by weight of water which corresponds to 7.5 moles of water leaving, the composition $Zr(Al_{13}O_4(OH)_{24})_{0.125}(HPO_4)_{1.125}(PO_4)_{0.875}$. The surface area increased from 2 m$^2$/g to 35 m$^2$/g. Further heating resulted in a loss of water from the hydroxyl groups of ~5% to convert the aluminum species to $Al_2O_3$ with further shrinkage of the interlayer spacing.

The inventor has been shown that the degree of crystallinity of α-zirconium phosphate is strongly dependent on the concentration of phosphoric acid in which the gel is refluxed. Slightly different products are produced by variation of the crystallinity. For example, the highly crystalline sample made by refluxing the gel in 12M $H_3PO_4$ yield large interlayer spacings, up to 30 Å, on pillaring, whereas, those samples which are lower in crystallinity yield interlayer spacing in the range of 13–17 Å, and may have lost some phosphate.

EXAMPLE XIII

Pillared α-Zirconium Phosphate 10 g of α-zirconium phosphate was prepared by refluxing an amorphous gel in 12M $H_3PO_4$ for 14 days, yielded a highly crystalline product with an average particle size of 1–2μ. One gram of this material was slurried in 0.1 butylamine for 2 hours, filtered off and added to 100 ml of a 10% MICRO-DRY ® solution. This mixture was kept at 60° C. for 3 hours, filtered, washed with water and air dried. This product had an interlayer spacing of 29.5 Å as shown by X-ray diffraction and an aluminum content of 15%. Drying at 200° C. reduced the interlayer spacing to 24 Å. However, this high spacing shows that pillaring with a double layer of the $Al_{13}$ species has occurred.

EXAMPLE XIV

Pillared Zirconium Phosphate 4.5:48

A 10 g sample of zirconium phosphate get was refluxed in 4.5M $H_3PO_4$ for 48 hours. This produces a semi-crystalline product as shown by the X-ray pattern in FIG. 4. One gram of this product was intercalated with hexylamine to yield an intercalate with a 21.5 Å interlayer spacing. This intercalate was slurried with 100 ml of a 10% MICRO-DRY ® solution and kept at 70° C. for 4 hours. The filtered air dried product contained 13% by weight of Al, had an interlayer spacing of 14.5 Å and a surface area dried at 200° C. of 48 m$^2$/g.

Pillaring with this semi-crystalline 4.5:4 α-zirconium phosphate demonstrates that layered materials can be pillared irrespective of the degree of crystallinity. However, there is less than 2:1 ratio of $PO_4$ to Zr because the filtrate contained about 10% of the original phosphate ion.

EXAMPLE XV

Use of Other Cations for Pillaring

In addition to the aluminum Keggin ion, the gallium analogue $[Ga_{13}O_4(OH)_{24}(H_2O)_{12}]^{7+}$, or the mixed analogue $[GaAl_{12}O_4(OH)_{24}(H_2O)_{12}]^{7+}$ or zirconium or chromium or bismuth may be used. The ions may also be of different types as for example $[Zr(OH)_2\cdot H_2O]_4^{8+}$. The latter cation is obtained by preparing a 0.1M solution of zirconyl chloride $ZrOCl_2\cdot 8H_2O$ and boiling or partially neutralizing the solution. This may be done by direct addition of base or by dissolving some zirconium hydroxide (hydrous zirconium oxide, $Zr(O_2\cdot nH_2O)$ or basic zirconium carbonate in the zirconyl chloride solution.

EXAMPLE XVI

A 1 g sample of α-zirconium phosphate (4.5:48) was added to 100 ml of 0.1M hexylamine solution. The mixture was stirred for 1 hour to ensure complete intercalation of the amine between the zirconium phosphate layers. This intercalate was then filtered off and added to 100 ml of a zirconyl chloride solution which has been prepared as follows: a 0.1M solution of $ZrOCl_2\cdot 8H_2O$ was prepared and 1 g of freshly prepared $Zr(OH)_4\cdot 2H_2O$ was dissolved in 100 ml of the zirconyl chloride solution. The resultant solution was then stirred for 1 h with the zirconium phosphate. The recovered solid had an X-ray pattern in which the first reflection was 20.1 Å. Heating to 200° C. reduced the interlayer spacing to ~19 Å.

EXAMPLE XVII

Antimony Phosphates

There is a family of antimony phosphates, two of which are layered and have been pillared by the inventor. One of them, $KSb(PO_4)_2$, is the antimony analogue of α-zirconium phosphate. This compound was prepared at elevated temperature by a solid state reaction as described by Piffard et al., *J. Solid State Chem.* 60:209 (1985). The potassium salt was boiled in 6M HCl to produce the acid form $HSb(PO_4)_2\cdot nH_2O$. The X-ray powder pattern is listed in Table 5. This solid was then intercalated with butylamine or hexylamine to enlarge the interlayer distance to 16.4 Å as shown in Table 5. This intercalate was then added to a 10% solution of MICRO-DRY ® (aluminum chlorhydrate) and shaken for one hour. Several drops of NaOH were added to ensure that the pH was sufficiently high for the aluminum Keggin ion to be exchanged as shown below.

1 g of $KSb(PO_4)_2$ was added to 100 ml of 1M HCl and kept at 50°±5° for 5 hours. The solid was then filtered off and retreated with 100 ml of 1M HCl at 50° C. An X-ray powder pattern showed that the potassium salt had been converted to $HSb(PO_4)_2\cdot 2H_2O$. This solid was recovered by filtration and then slurried in 100 ml of 1M butylamine for 1 hr. This treatment converted the solid to the butylamine intercalate as shown by the X-ray pattern of Table I. The thickness of an $Sb(PO_4)_2$ layer is 6.8 Å. Thus, the amine increased the interlayer spacing by 9.6 Å. The intercalated solid was then filtered off and added to a 10% MICRO-DRY ® solution which was heated to 60° C. A few drops of NaOH were added to insure that the pH remained above 4. The solid was then filtered off and washed once with 25 ml water and air dried. The interlayer spacing was 16.3 Å. Analysis gave 7.8% Al and 8% $H_2O$ to 100° C. which correspond to $Sb(PO_4)_2H_{0.03}[Al_{13}O_4(OH)_{24}(H_2O)_{12}]_{0.1}\cdot 2H_2O$.

The second antimony phosphate has the formula $H_3Sb_3PO_2O_{14}$. It was first prepared from $K_3Sb_3PO_2O_{14}$ which was made by a high temperature solid state reaction as described by piffard et al., *J. Solid State Chem.* 58:253 (1985). The potassium salt was then treated with 8N $HNO_3$ at 50° C. for 2 h to produce $H_3Sb_3PO_2O_{14}\cdot 10H_2O$, according to Piffard et al., *Rev. Chem. Min.* 23:766 (1988).

EXAMPLE XVIII 2.5 g of $SB_2O_3$, 1.32 g $NH_4H_2PO_4$ and 1.754 g of $KNO_3$ were ground together with a mortar and pestle and heated in a platinum crucible for 4 hours at 300° C., and then for 24 hours at 1000° C. The product gave an X-ray diffraction pattern which accorded with the one published in *J. Solid State Chem.* 58:253 (1985). This solid was then slurried with 50 ml of 8M $HNO_3$ for 2 hours, filtered and retreated with 8M $HNO_3$. The product gave an X-ray pattern which accorded with that published in *Rev. Chim. Min.* 23:766 (1988) for $H_3Sb_3P_2O_{14}\cdot10H_2O$. One gram of $H_3Sb_3P_2O_{14}\cdot10H_2O$ was dispersed in 80 ml of water and 20 ml of Jeffamine M 360 added. Jeffamines are polyether amines which exhibit detergent action. The one used here is $C_4H_9O(CH_2CH_2O)_3$—$(CH_3CH-CH_2O)_2CH_2CH_2NH_2$ (mol. wt.≈360). The mixture was heated at 50° C. for 12 hours during which time the amine intercalated between the phosphate layers. Weight loss (TGA) data indicated that 3 moles of Jeffamine were intercalated to give $H_3SbP_2O_{14}(JA)_3$ where JA=Jeffamine. The interlayer spacing was The intercalate was then added to 50 ml of a solution containing 7.5 g of MICRODRY® (aluminum chlorhydrate) and stirred for 15 hours. The solid was then filtered off washed and dried at 70° C. for 1 hour. The interlayer spacing was 25.2 Å and the infrared spectrum showed that no Jeffamine was present i.e. bands at 2850-2950 cm$^{-1}$, 2598, 2513, 1462, 1388, 1355 cm$^{-1}$ are missing from this product. Drying the aluminum containing antimony phosphate at 200° C. for 2 hours reduced the interlayer spacing to 19.1 Å. This solid contained 6% Al and 30% water indicative of a highly porous product. When heated to 400° C. the X-ray pattern was that of an amorphous product and this amorphous pattern persisted to 900° C. In contrast the Jeffamine intercalate on heating to 900° C. yielded a mixture of $SbPO_4$ and $Sb_2O_4$. Thus, the aluminum between the layers prevented the formation of the antimony phosphate and oxide.

EXAMPLE XIX

Pillared Titanates

There are several families of alkali titanates which have been reported in the literature [Izawa et al., *Polyhedron* 2:741 (1983); Raveau, *Rev. Chim. Miner.* 21:391 (1984)]. They have the general formula $M_2Ti_xO_{2x+1}$ where M=an alkali metal or Tl and x=1-10. Many of these compounds are layered and subject to pillaring. The general procedure is to treat the titanate with acid to replace the alkali metal with protons, intercalate an amine and then exchange the amine by a pillaring agents as detailed below.

EXAMPLE XX

Pillared $K_2Ti_4O_9$ 4.5 g of dry $TiO_2$ was thoroughly mixed with 2.02 g of dry $K_2CO_3$ in an agate mortar and pestle. This mixture was then heated at 810° for 20 hours, reground and heated an additional 20 hours. The X-ray pattern of the cooled solid was in good agreement with that reported [Dion et al., *J. Inorg. Nucl. Chem.* 40:917 (1978)]. The solid Was then treated with 1M HCl for 8 hr. This removed more than 90% of the potassium to yield essentially $H_2Ti_4O_7\cdot2H_2O$ with perhaps 5-10% of the original K$^+$ still present. The resultant solid was treated with 6M hexylamine to yield a solid with a 21.7 Å interlayer spacing. This solid was then contacted with a 10% MICRO-DRY® solution which had been boiled to ensure that hydrolysis to the $Al_{13}$ Keggin ion was maximized. The resultant product after 6 hours treatment had an interlayer spacing of about 19 Å. This interlayer spacing decreased somewhat on heating to 200° C. ($\sim$18 Å) but clearly shows that pillaring occurred. The aluminum content was approximately 13% and the surface area was 205 m$^2$/g. This data indicates a formula close to $Ti_4O_9[Al_{13}O(OH)_{24}(H_2O)_{12}]_{2/7}\cdot6H_2O$.

Another class of compounds that have been pillared are the titanoniobates with perovskite structures. These compounds can be represented by the formula $M[(CA,Sr)_{n-1}Nb_3Ti_{n-3}O_{3n+1}]$ where n=3-7 and M=a univalent element such as K$^+$, Rb$^+$, Cs$^+$, Tl$^+$, Li$^+$, Na$^+$, and NH$^{+4}$. The first member of the series n=3 is a niobate $KCa_2Nb_3O_{10}$. It was prepared according to Dion et al., *Mat. Res. Bull.* 16:1429 (1981).

EXAMPLE XXII 1.36 g of $KCa_2Nb_3O_{10}$ was protonated by stirring in 50 ml of 6N HCl for 20 hours at 60° C. The solid was then filtered off, washed free of chloride ion and then added to 50 ml of 0.5M n-hexylamine and stirred for 22 hours. Analysis for the amine intercalated product was in accord with the formula $HCa_2Nb_3O_{10}(C_6H_{13}NH_2)_{0.75}\cdot H_2O$. The interlayer spacing increased from 16.2 Å for $HCa_2Nb_3O_{10}\cdot2H_2O$ to 28.6 Å for the amine intercalate. 1.2 g of the amine intercalate was added to a 60 ml 7.5% solution of chlorhydrate which had been heated to 80° C. and then aged for 1 month to increase the mount of $Al_{13}$ Keggin ion in the solution. The mixture was kept at 50° C. for 24 hours, filtered washed and air dried. Elemental analysis gave 11.9% Ca, 7.17% Al, H$_2$O (TGA) 2.6%. Calculated for $Ca_2Nb_3O_{10}[Al_{13}O_4(OH)_{24}(H_2O)_{13}]_{1/7}\cdot H_2O$: 11.7% Ca, 7.3% Al, 2.6% H$_2$O.

EXAMPLE XXIII

Pillared $HCa_3Nb_3TiO_{13}$ $KCa_3Nb_3TiO_{13}$ was prepared as described in a paper submitted to the *Journal of Solid State Chemistry* (by R. A. Mohan Ram and A. Clearfield). $KCa_2Nb_3O_{10}$ was mixed with $CaTiO_3$ in a 1:1 mole ratio and heated at 1235° C. for 3 days. The product, $KCa_3Nb_3TiO_{13}$ gave an X-ray diffraction pattern which could be indexed on the basis of a unit cell of dimensions a=3.842±0.002 Å, b=3,861±0.002 Å, c=37.27±0.01 Å. The increase in c-axis over that of $KCa_2Nb_3O_{10}$ was 7.91 Å which is just the distance expected if one more perovskite block is added (n=4) to $KCa_2Nb_3O_{10}$. Approximately 2 g of $KCa_3Nb_3TiO_{13}$ was added to 100 ml of 6 NHCl and stirred for 20 hours at room temperature. This procedure converted the K$^+$ phase to the H$^+$ phase. The solid was recovered, washed free of acid and added to 50 ml of a 0.5M n-hexylamine solution and kept at 60° C. for 16 hours. The hexylamine was incorporated into the solid as shown by an increase of the interlayer spacing from 18.6 Å to 32.16 Å. The aluminum Keggin ion $[Al_{13}O_4(OH_{24}(H_2O)_{12}]^{7+}$ was ion exchange for the amine (as the n-hexylammonium ion) in 60 ml of a 7.5% aluminum chlorhydrate solution whose pH was adjusted to 4.8. The mixture was kept at 50° C. for 20 hours. The recovered product was washed and dried. Found: 7.44% Al. 12% Ca, 5.44% Ti. Required for $Ca_3Nb_3TiO_{13}[Al_{13}O_4(OH)_{24}(H_2O)_{12}]_{1/7}$: 14.9% Ca, 5.96% Ti, 6.06% Al. The interlayer spacing was 38.8 Å which however shrank to 27.27 Å on heating at 200° C. for 24 hours. This represents an increase of 8.7 Å over the original value of 18.6 for the unpillared compounds and shows that the aluminum Keggin ion remains intact between the layers. In subsequent experiments $HCa_4Nb_3TiO_2O_{16}$ and $HCa_3Sr_{0.5}Nb_3Ti_{0.5}O_{11.5}$ have also been pillared (data not shown).

TABLE 5

X-RAY POWDER PATTERNS OF $HSb(PO_4)_2 \cdot NH_2O$ AND ITS BUTYLAMINE AND HEXYLAMINE INTERCALATES

| $Hsb(PO_4)_2 \cdot nH_2O$ | | Butylamine Intercalate | | Hexylamine Intercalate | |
|---|---|---|---|---|---|
| d(Å) | $I/I_o$ | d(Å) | $I/I_o$ | d(Å) | $I/I_o$ |
| 12.4 | 100 | 16.4 | 100 | 21.0 | 100 |
| 6.15 | 80 | 8.2 | 50 | 10.5 | 30 |
| 4.56 | 20 | 5.5 | 30 | 6.94 | 10 |
| 4.18 | 15 | 4.54 | 8 | 5.25 | 5 |
| 3.85 | 10 | 4.04 | <5 | 4.2 | >5 |
| 3.48 | 10 | 3.20 | 7 | | |
| 3.21 | 25 | 3.13 | 5 | | |
| 3.13 | 10 | 2.45 | 8 | | |
| 3.11 | 5 | | | | |
| 2.78 | <5 | | | | |
| 2.55 | 15 | | | | |
| 2.45 | | | | | |

The foregoing description has been directed to particular embodiments of the invention in accordance with the requirements of the United States patent statutes for the purposes of illustration and explanation. It will be apparent to those skilled in this art, however, that many modifications and changes in the compositions and methods set forth will be possible without departing from the scope and spirit of the invention. It is intended that the following claims be interpreted to embrace all such modifications and changes.

What is claimed is:

1. A pillared composition comprising a layered material which does not swell appreciably in water, the layers of which are selected from the group consisting of layers of a group IV A or IVB phosphate, alkali titanate, titanium niobate, alkaline niobate, antimonate, manganate, silicate, or metal oxide and said layers are separated by a pillaring substance, wherein said pillaring substance is selected from the group consisting of alumina polymer, zirconium polymer, chromium polymer and bismuth polymer.

2. The pillared composition of claim 1 wherein said layers are layers of a group IV A or IV B phosphate.

3. The pillared composition of claim 2 wherein said layers of group IV A or IV B phosphate are selected from the group consisting of titanium phosphate, zirconium phosphate, cerium phosphate, thorium phosphate, germanium phosphate, tin phosphate, lead phosphate, silicon phosphate and vanadium(IV) phosphate.

4. The pillared composition of claim 3 wherein said layers of group IV A and IV B phosphate are further selected from the group consisting of hydroxy titanium phosphate, hydroxy zirconium phosphate, hydroxy cerium phosphate, hydroxy thorium phosphate, hydroxy germanium phosphate, hydroxy tin phosphate, hydroxy lead phosphate, hydroxy silicon phosphate, and hydroxy vanadium(IV) phosphate.

5. The pillared composition of claim 3 wherein said zirconium phosphate is a semi-crystalline α-zirconium phosphate.

6. The pillared composition of claim 3 wherein said titanium phosphate is a semi-crystalline α-titanium phosphate.

7. The pillared composition of claim 1 wherein said layers are layers of group IV A or IV B phosphate and said pillaring substance is aluminum polymer.

8. The pillared composition of claim 7 further defined as:
a) $A[Al_{13}O_4(OH)_{24}(H_2O)_{12}]_a{}^{7+}(HPO_4)_b(PO_4)_d \cdot xH_2O$, where $b+d=2$, $7a+b=2$, $x=0 - 10$ and A is selected from the group consisting of titanium, zirconium, cerium, thorium, germanium, tin, lead, silicon, and vanadium(IV);
b) $A[Al_{13}O_4(OH)_{24+n}(H_2O)_{12-n}]_a{}^{(7-n)}(HPO_4)_b(PO_4)_d \cdot xH_2O$, where $b+d=2$, $(7-n)a+b=2$, $x=0 - 10$ and A is selected from the group consisting of titanium, zirconium, cerium, thorium, germanium, tin, lead, silicon, and vanadium(IV);
c) $A(Al_2O_3)_{13a/2}(HPO_4)_2$, where A is selected from the group consisting of titanium, zirconium, cerium, thorium, germanium, tin, lead, silicon, and vanadium(IV);
d) $A[Al_{13}O_4(OH)_{24}(H_2O)_{12}]_a(OH)_c(HPO_4)_b(PO_4)_d \cdot xH_2O$, where $c/2+b=2$, $c/2+b=2$, $x=0 - 10$ and A is selected from the group consisting of titanium, zirconium, cerium, thorium, germanium, tin, lead, silicon, and vanadium(IV); or
e) $A[Al_3O_4(OH)_{24+n}(H_2O)_{12}]_a{}^{(7-n)}+(OH)_c(HPO_4)_b(PO_4)_d \cdot xH_2O$, where $c/2+b+d=2$, $(7-n)a+b+c/2=2$, $x=1 - 10$, and A is selected from the group consisting of titanium, zirconium, cerium, thorium, germanium, tin, lead, silicon, and vanadium(IV).

9. The pillared composition of claim 8 further defined as a) $Zr(Al_2O_3)_{0.8125}(HPO_4)_2$;
b) $Ti(OH)_{0.96}(PO_4)_{1.52}[Al_{13}O_4(OH)_{24}(H_2O)_{12}]_{0.216} \cdot xH_2O$;
c) $Ti(OH)_{0.96}(PO_4)_{1.52}[Al_{13}O_4(OH)_{24}(H_2O)_{12}]_{0.216} \cdot 5H_2O$;
d) $Zr(Al_{13}O_4(OH)_{24}(H_2O)_{12})_{0.125}(HPO_4)_{1.125}(PO_4)_{0.875} \cdot 6H_2O$; or
e) $Zr(Al_{13}O_4(OH)_{24})_{0.125}(HPO_4)_{1.125}(PO_4)_{0.875}$.

10. The pillared composition of claim 1 wherein said layers are layers of alkali titanate.

11. The pillared composition of claim 10 wherein said alkali titanate is defined as $M_2Ti_nO_{2n+1}$, wherein M is $Tl^+$, $H^+$ or an alkali metal such as $Li^+$, $Na^+$, $K^+$, $Rb^+$, or $Cs^+$ and $n=2 - 20$.

12. The pillared composition of claim 11 wherein said alkali titanate is further defined as $M_2Ti_2O_5$, $M_2Ti_3O_7$, $M_2Ti_4O_9$, $M_2Ti_5O_{11}$, or $M_2Ti_7O_{15}$.

13. The pillared composition of claim 10 wherein said layers are layers of alkali titanate and said pillaring substance is aluminum polymer.

14. The pillared composition of claim 13 wherein said alkali titanate is further defined as
a) $[M_{2-(7-b)a}Ti_n(Al_{13}O_4(OH)_{24+b}(H_2O)_{12-b})_a{}^{(7-b)}+O_{2n+1} \cdot xH_2O]$ where $b=0 - 3$, $n=2 - 10$, $x=0 - 6$, $(7-b)a=0 - 2$, and M is $Tl^+$, $H^+$ or an alkali metal such as $Li^+$, $Na^+$, $K^+$, $Rb^+$, or $Cs^+$; or
b) $M_2Ti_n(Al_2O_3)_{13a/2}O_{2n+1}$, where $n=2 - 10$ and M is $Tl^+$, $H^+$ or an alkali metal such as $Li^+$, $Na^+$, $K^+$, $Rb^+$, or $Cs^+$.

15. The pillared composition of claim 1 wherein said layers are layers of titanium niobate.

16. The pillared composition of claim 15 wherein said titanium niobate is $M(Ca_{2+n})Nb_3Ti_nO_{10+3n}$ where $n=1 - 3$ or $M(Ca_2Sr_{n/2})Nb_3Ti_{n/2}O_{10+3n/2}$ where $n=0.5 - 1$ and M is a univalent ion such as $K^+$, $Rb^+$, $Cs^+$, $Tl^+$, $Li^+$, $Na^+$, $H^+$, or $Ag^+$.

17. The pillared composition of claim 16 wherein said titanium niobate is further defined as $KCa_2Nb_3O_{10}$, $KCa_3Nb_3TiO_{13}$, $MTiNbO_5$, $M_3Ti_5NbO_{14}$, or $MTi_2NbO_7$.

18. The pillared composition of claim 15 wherein said layers are layers of titanium niobate and said pillaring substance is aluminum polymer.

19. The pillared composition of claim 18 wherein said titanium niobate is further defined as a) $[M_{1-(7-b)a}Ca_{2+n}Nb_3Ti_n[Al_{13}O_4(OH)_{24+b}(H_2O)_{12-b}]_a^{(7-b)+}O_{10+3n/2} \cdot xH_2O]$ where $n = 0 - 2$, $b = 0 - 3$, $x = 0 - 10$, $(7-b)a = 0 - 1$ and M is a univalent ion such as $K^+$, $Rb^+$, $Cs^+$, $Tl^+$, $Li^+$, $Na^+$, $H^+$, or $Ag^+$; or
  b) $M_2Ca_{2+n}Nb_3Ti_n(Al_2O_3)_{13a/2}O_{10+3n/2}$ and M is a univalent ion such as $K^+$, $Rb^+$, $Cs^+$, $Tl^+$, $Li^+$, $Na^+$, $H^+$, or $Ag^+$.

20. The pillared composition of claim 1 wherein said layers are layers of alkaline niobate.

21. The pillared composition of claim 20 wherein said layered alkaline niobate is $M(Ca,Sr)_2Na_nNb_{3+n}O_{10+3n}$ where M = a univalent ion $Li^+$, $Na^+$, $K^+$, $Rb^+$, $Cs^+$, $Tl^+$, $Ag^+$, or $H^+$ and $n = 1 - 4$.

22. The pillared composition of claim 1 wherein said layers are layers of antimonate.

23. The pillared composition of claim 22 wherein said antimonate is $MSbO_3 \cdot xH_2O$ where M is a univalent ion $K^+$, $Rb^+$, $Cs^+$, $Tl^+$, $Li^+$, $Na^+$, $H^+$, or $Ag^+$ and $x = 0 - 6$.

24. The pillared composition of claim 22 wherein said antimonate is further defined as $MSb(PO_4)_2 \cdot xH_2O$ where M is a univalent ion $K^+$, $Rb^+$, $Cs^+$, $Tl^+$, $Li^+$, $Na^+$, $H^+$, or $Ag^+$ and $x = 0 - 6$; $H_3Sb_3P_2O_{14} \cdot xH_2O$ where $x = 0 - 6$; or $M_3Sb_3P_2O_{14}$; where M is a univalent ion $K^+$, $Rb^+$, $Cs^+$, $Tl^+$, $Li^+$, $Na^+$, $H^+$, or $Ag^+$.

25. The pillared composition of claim 1 wherein said layers are layers of manganate.

26. The pillared composition of claim 25 wherein said manganate is $MMnO_2$, $M_{0.7}MnO_2$, or $M_{0.7}MnO_{.25}$, where M is a univalent ion $K^+$, $Rb^+$, $Cs^+$, $Tl^+$, $Li^+$, $Na^+$, $H^+$, or $Ag^+$.

27. The pillared composition of claim 1 wherein said layers are layers of silicate.

28. The pillared composition of claim 27 wherein said silicate is $M_2Si_{14}O_{29}$, where M is a univalent ion $K^+$, $Rb^+$, $Cs^+$, $Tl^+$, $Li^+$, $Na^+$, $H^+$, or $Ag^+$.

29. The pillared composition of claim 1 wherein said layers are layers of metal oxide.

30. The pillared composition of claim 29 wherein said metal oxide is selected from a group consisting of $V_2O_5$, $MoO_3$, $WO_3$, $UO_3$ and $Ag_6Mo_{10}O_{33}$.

* * * * *

UNITED STATES PATENT AND TRADEMARK OFFICE
CERTIFICATE OF CORRECTION

PATENT NO. : 5,200,378
DATED : April 6, 1993
INVENTOR(S) : Abraham Clearfield

It is certified that error appears in the above-indentified patent and that said Letters Patent is hereby corrected as shown below:

Column 4, Line 54, delete "$(PO_4)_2$" and replace with --$(PO_4)_d$--.

Column 7, Line 36, delete "$NH^+$" and replace with --$NH_4^+$--.

Column 13, Line 9, delete "o-type" and replace with --$\alpha$-type--.

Column 14, Line 58, delete "Chlorhydrate" and replace with --chlorhydrate--.

Column 15, Line 24, delete "(Column 2, lines 5-10)".

Column 16, Line 58, delete "$Zr(HPO_4)_2H_2O$" and replace with --$Zr(HPO_4)_2 \bullet H_2O$--.

Column 16, Line 63, delete "MI CRO-DRY" and replace with --MICRO-DRY--.

Column 17, Line 49, delete "4.5:4" and replace with --4.5:48--.

Column 18, Line 60, delete "piffard" and replace with --Piffard--.

Column 19, Line 19, insert --36.4Å-- after "was".

Column 19, Line 21, delete "MICRODRY" and replace with --MICRO-DRY--.

Column 19, Line 60, delete "Was" and replace with --was--.

UNITED STATES PATENT AND TRADEMARK OFFICE
CERTIFICATE OF CORRECTION

PATENT NO. : 5,200,378
DATED : April 6, 1993
INVENTOR(S) : Abraham Clearfield

It is certified that error appears in the above-indentified patent and that said Letters Patent is hereby corrected as shown below:

Column 21, claim 1, line 37, delete "IVB" and replace with --IV B--

Column 21, claim 1, line 42, delete "alumina" and replace with --aluminum--

Signed and Sealed this

Eighteenth Day of January, 1994

Attest:

BRUCE LEHMAN

*Attesting Officer*    *Commissioner of Patents and Trademarks*